(12) United States Patent
Eguchi

(10) Patent No.: US 9,030,752 B2
(45) Date of Patent: May 12, 2015

(54) ZOOM LENS AND IMAGE PICKUP APPARATUS

(71) Applicant: Canon Kabushiki Kaisha, Tokyo (JP)

(72) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/928,601

(22) Filed: Jun. 27, 2013

(65) Prior Publication Data

US 2014/0002714 A1   Jan. 2, 2014

(30) Foreign Application Priority Data

Jun. 29, 2012   (JP) .................................. 2012-146650

(51) Int. Cl.
*G02B 15/14* (2006.01)
*G02B 15/17* (2006.01)
*G02B 27/64* (2006.01)

(52) U.S. Cl.
CPC ................ *G02B 15/14* (2013.01); *G02B 15/17* (2013.01); *G02B 27/646* (2013.01)

(58) Field of Classification Search
CPC ........ G02B 15/14; G02B 15/15; G02B 15/16; G02B 15/20

USPC .................................. 359/676, 683, 684, 686
See application file for complete search history.

(56) References Cited

FOREIGN PATENT DOCUMENTS

JP   H1-126614 A   5/1989
JP   H6-194574 A   7/1994

*Primary Examiner* — David N Spector
*Assistant Examiner* — Gary O'Neill
(74) *Attorney, Agent, or Firm* — Carter, DeLuca, Farrell & Schmidt, LLP

(57) ABSTRACT

The zoom lens includes at least five lens groups including first, second, third, fourth and fifth lens groups respectively having positive, negative, negative, positive and positive refractive powers. At least four movable lens groups are moved during zooming. At least two movable lens groups placed further on an image side than an aperture. C1 and C2 lens groups are moved so as to draw mutually different loci and such that a distance therebetween becomes maximum at a middle zoom position. The C1 and C2 lens groups are located further on a same side at the telephoto end than at a wide-angle end. At least one of D1 and D2 lens groups is moved during the zooming so as to be located further on an object side at a telephoto end than at the wide-angle end. A distance therebetween at the telephoto end becomes larger than that at wide-angle end.

10 Claims, 13 Drawing Sheets

ZOOM LENS AND IMAGE PICKUP APPARATUS

BACKGROUND OF THE INVENTION

1. Field of the Invention

The present invention relates to a zoom lens suitable for image pickup apparatuses provided with a solid image sensor such as video camera, digital still cameras, broadcasting cameras and monitoring cameras and for film cameras using a silver-halide film.

2. Description of the Related Art

Zoom lenses to be used for the above-mentioned image pickup apparatuses are required to have high optical performance. As one of the zoom lenses, a positive-lead type zoom lens whose most-object side lens group has a positive refractive power is known.

It is important for such a positive-lead type zoom lens, in order to achieve a wide angle of view, a high zoom ratio and high optical performance in its entire zoom range, to appropriately set its lens configuration (zoom type) and a configuration of each of lens groups constituting the zoom lens.

In general, in order to achieve high optical performance, it is necessary that various aberrations, particularly field curvature and astigmatism, be well corrected. For example, in order to achieve high optical performance in the entire zoom range with a high zoom ratio in the positive-lead type zoom lens, it is important to appropriately set lens groups to be moved during zooming and conditions relating to the movement of these lens groups.

Japanese Patent Laid-Open No. 01-126614 discloses a zoom lens including, in order from an object side to an image side, a first lens group having a positive refractive power, second, third and fourth lens groups to be moved during zooming and a fifth lens group having a positive refractive power and being not moved during the zooming, and further including an aperture stop placed between the fourth and fifth lens groups. This zoom lens moves during the zooming only the second, third and fourth lens groups placed further on the object side than the aperture stop, so that field curvature and astigmatism are significantly varied during the zooming, which makes difficult to correct them.

Japanese Patent Laid-Open No. 06-194574 discloses a zoom lens including, in order from an object side to an image side, first, second, third, fourth and fifth lens groups respectively having positive, negative, negative, positive and positive refractive powers, and moving these first to fifth lens groups during zooming. This zoom lens increases number of lens groups moved during the zooming in order to achieve a wide angle of view and a high zoom ratio. However, also in this zoom lens, the field curvature and the astigmatism are significantly varied during the zooming, which makes difficult to correct them.

SUMMARY OF THE INVENTION

The present invention provides a zoom lens capable of providing a high zoom ratio and high optical performance in its entire zoom range, and further provides an image pickup apparatus using such a zoom lens.

The present invention provides as one aspect thereof a zoom lens including at least five lens groups. The at least five lens groups include, in order from an object side to an image side, a first lens group having a positive refractive power, a second lens group having a negative refractive power, a third lens group having a negative refractive power, a fourth lens group having a positive refractive power, and a fifth lens group having a positive refractive power. Of the at least five lens groups, at least four lens groups are moved during zooming on an optical axis, the at least four lens group including at least two lens groups placed further on the image side than an aperture to decide an axial maximum light flux diameter at a wide-angle end. Of the at least four lens groups to be moved during the zooming, a C1 lens group and a C2 lens group adjacent to each other are moved so as to draw mutually different loci during the zooming such that a distance between the C1 and C2 lens groups becomes maximum at a zoom position other than the wide-angle end and a telephoto end and such that the C1 and C2 lens groups are located further on a same side of the object and image sides at the telephoto end than at the wide-angle end. Of the at least two lens groups placed further on the image side than the aperture, at least one of a D1 lens group and a D2 lens group adjacent to each other is moved during the zooming so as to be located further on the object side at the telephoto end than at the wide-angle end and such that a distance between the D1 and D2 lens groups at the telephoto end becomes larger than that at wide-angle end.

The present invention provides as another aspect thereof an image pickup apparatus including a solid image sensor to receive an object image formed by the above-mentioned zoom lens.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

The following Zoom lenses, which are embodiments of the present invention, are based on an inventor's idea that, for a zoom lens in which variation of magnification is performed with sharing of a magnification varying burden mainly by a magnification varying part and a relay part, a configuration can be employed which moves at least two lens groups in the relay part during zooming without largely increasing a shared burden on the entire relay part and which can well correct, by changing a distance between the at least two moving lens groups, not only various aberrations generated at a wide-angle end (shortest focal length end) and a telephoto end (longest focal length end), but also ones remaining at other zoom positions.

A characteristic lens configuration of the zoom lens of each embodiment is as follows. The zoom lens includes at least five lens groups. The at least five lens groups include, in order from an object side to an image side, a first lens group having a positive refractive power, a second lens group having a negative refractive power, a third lens group having a negative refractive power, a fourth lens group having a positive refractive power, and a fifth lens group having a positive refractive power. Of the at least five lens groups, at least four lens groups are moved on an optical axis of the zoom lens during zooming. The at least four lens group to be moved during the zooming include at least two lens groups placed further on the image side than an aperture to decide an axial maximum light flux diameter at a wide-angle end.

Moreover, the at least four lens groups to be moved during the zooming include a C1 lens group and a C2 lens group adjacent to each other. The C1 and C2 lens groups are moved so as to draw mutually different loci (hereinafter also each referred to as "a movement locus") during the zooming, but are located further on a same side of the object and image sides at a telephoto end than at the wide-angle end. In addition, the C1 and C2 lens groups are moved so as to draw such movement loci that a distance between the C1 and C2 lens groups becomes maximum at a zoom position other than the wide-angle end and the telephoto end.

Furthermore, the at least four lens groups to be moved during the zooming include a D1 lens group and a D2 lens group adjacent to each other and placed further on the image side than the aperture. At least one of the D1 and D2 lens groups is moved during the zooming so as to be located further on the object side at the telephoto end than at the wide angle end and such that a distance between the D1 and D2 lens groups at the telephoto end becomes larger than that at the wide-angle end.

Figure 1A:
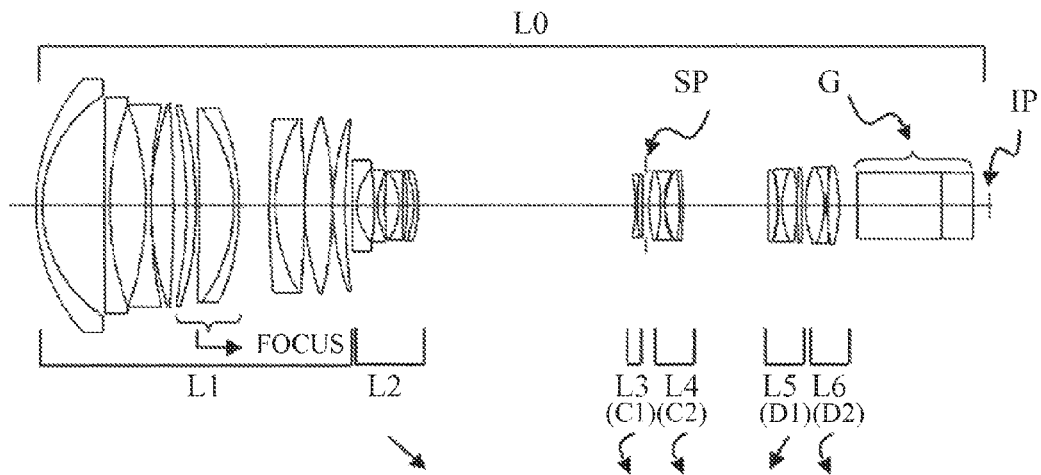
FIG. 1A is a sectional view of a zoom lens that is Embodiment 1 of the present invention at a wide-angle end.
Figure 1B:
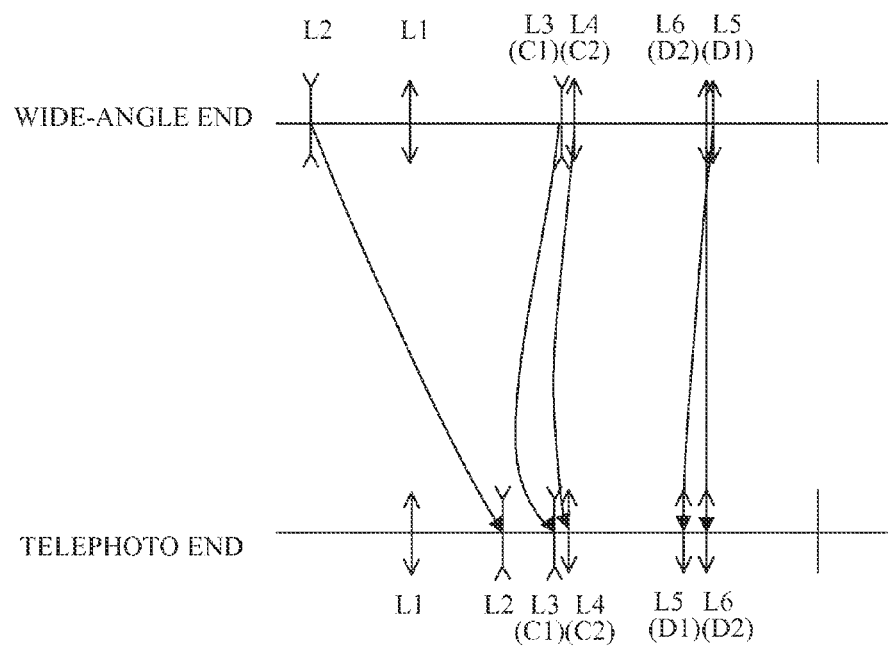
FIG. 1B shows movement loci of lens groups in the zoom lens of Embodiment 1.
Figure 2A:
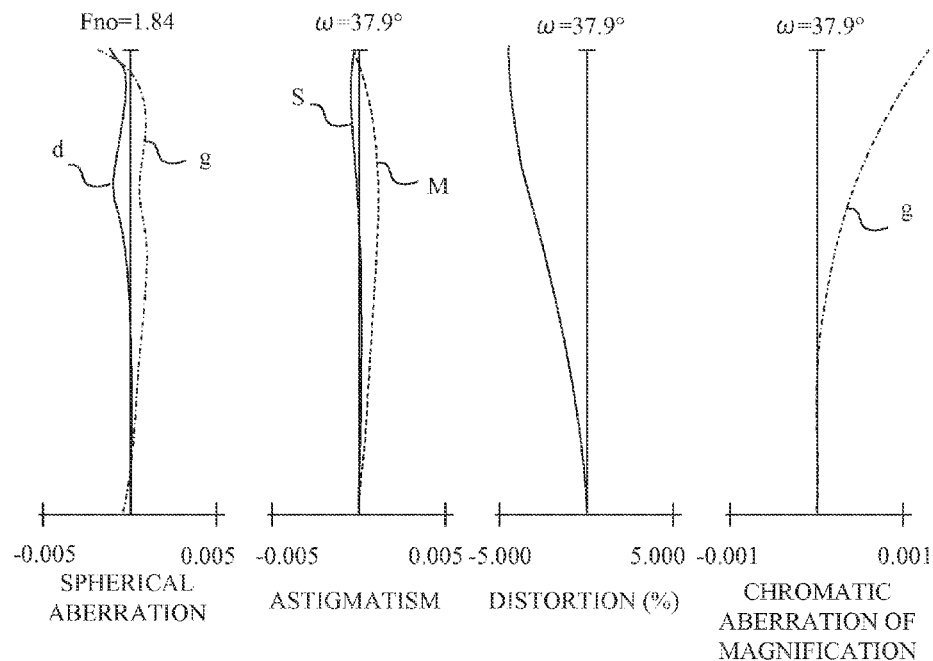
FIGS. 2A, 2B and 2C are respectively aberration charts of the zoom lens of Embodiment 1 at the wide-angle end, a middle zoom position and a telephoto end.
Figure 2B:
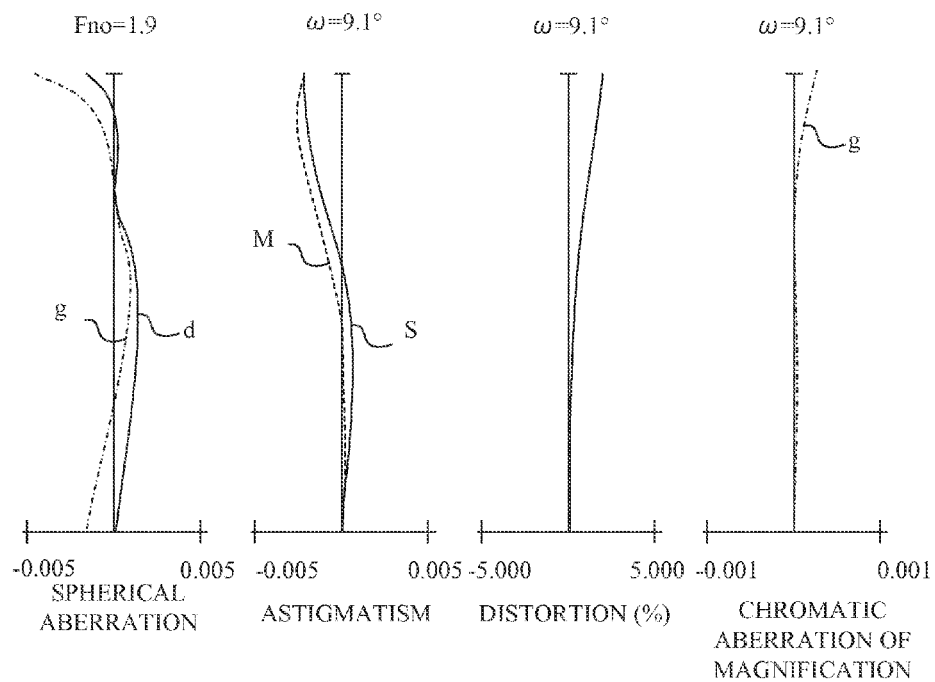
Figure 2C:
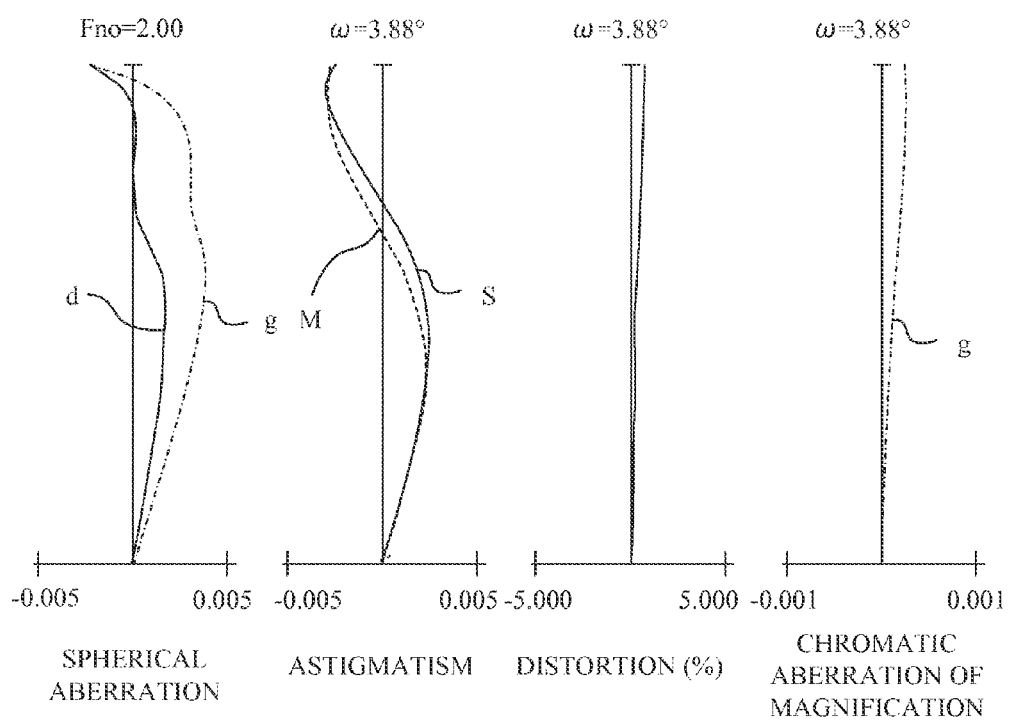

FIG. 1A is a sectional view of a zoom lens that is a first embodiment (Embodiment 1) at the wide-angle end, and FIG. 1B shows the movement loci of the respective lens groups. FIGS. 2A, 2B and 2C are respectively aberration charts of the zoom lens of Embodiment 1 at the wide-angle end, a middle zoom position and the telephoto end.

Figure 3A:
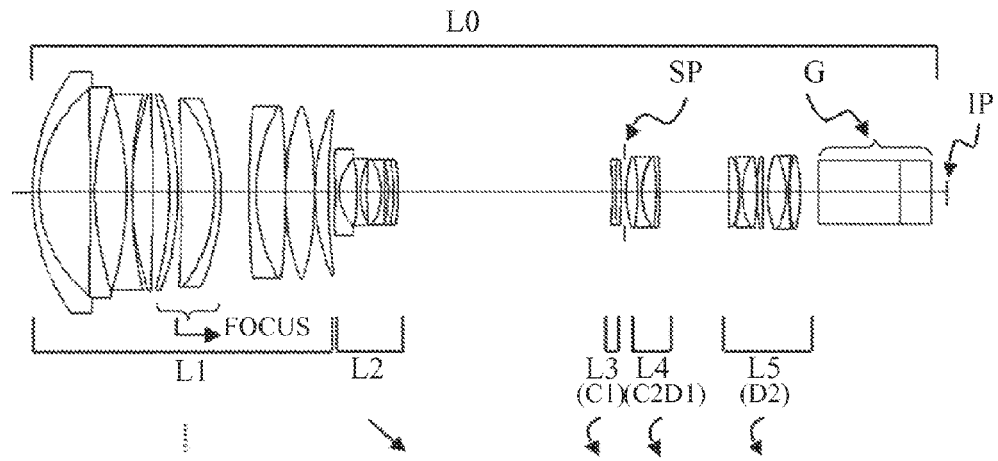
FIG. 3A is a sectional view of a zoom lens that is Embodiment 2 of the present invention at a wide-angle end.
Figure 3B:
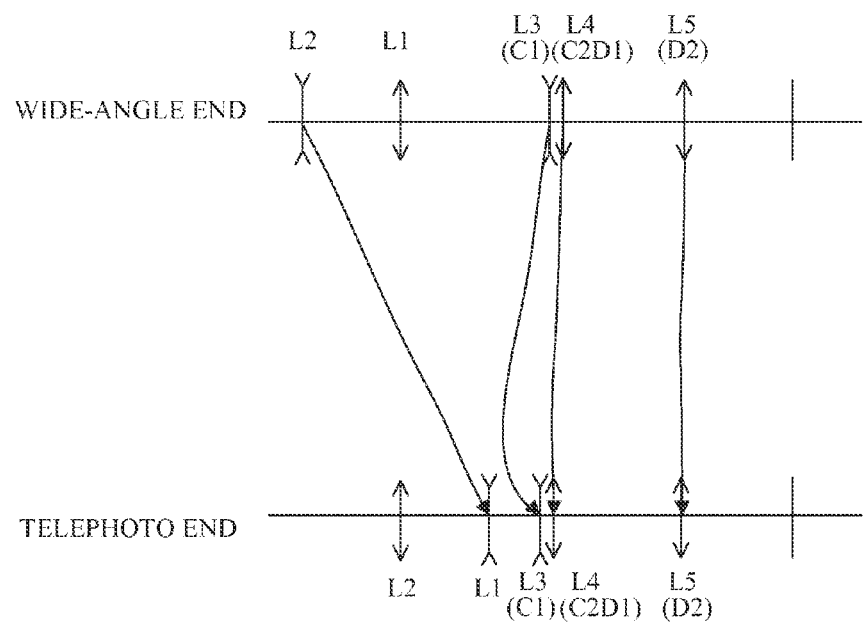
FIG. 3B shows movement loci of lens groups in the zoom lens of Embodiment 2.
Figure 4A:
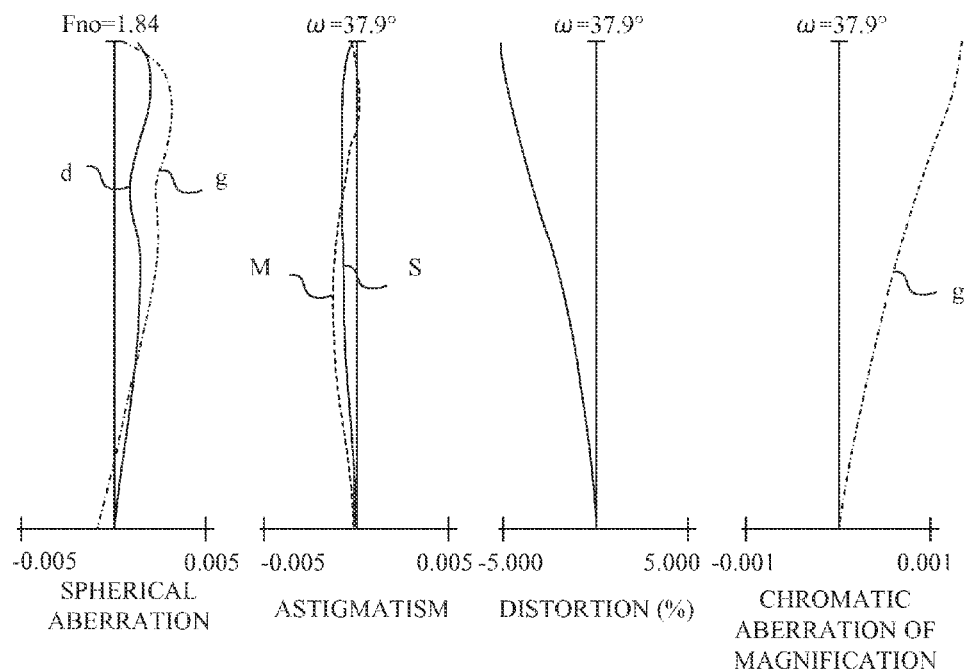
FIGS. 4A, 4B and 4C are respectively aberration charts of the zoom lens of Embodiment 2 at the wide-angle end, a middle zoom position and a telephoto end.
Figure 4B:
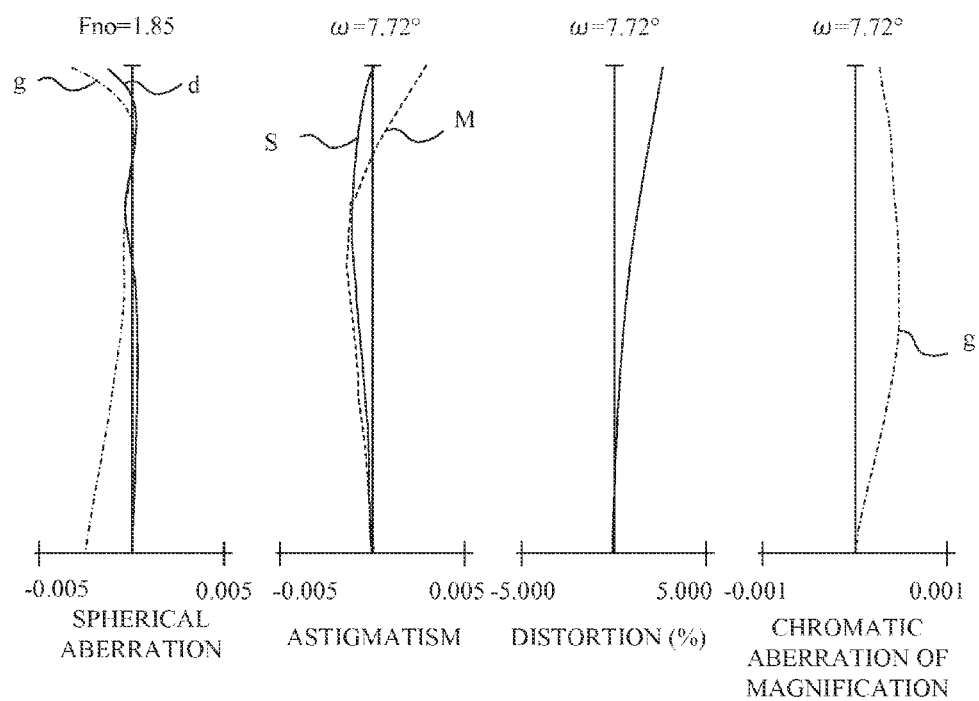
Figure 4C:
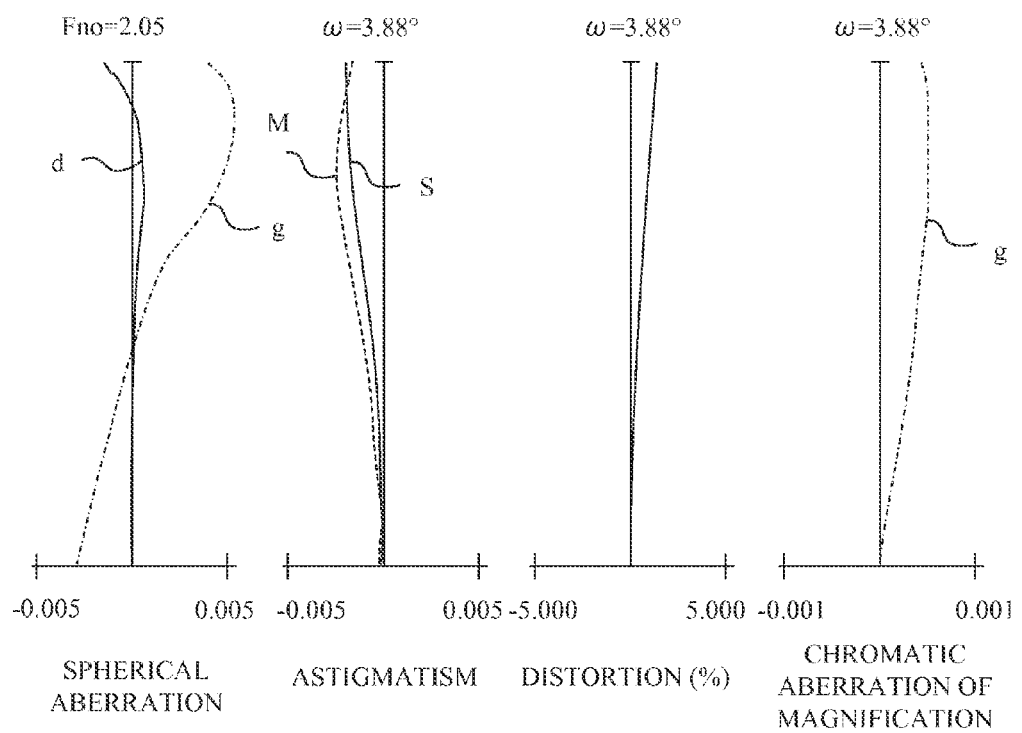

FIG. 3A is a sectional view of a zoom lens that is a second embodiment (Embodiment 2) at the wide-angle end, and FIG. 3B shows the movement loci of the respective lens groups. FIGS. 4A, 4B and 4C are respectively aberration charts of the zoom lens of Embodiment 2 at the wide-angle end, a middle zoom position and the telephoto end.

Figure 5A:
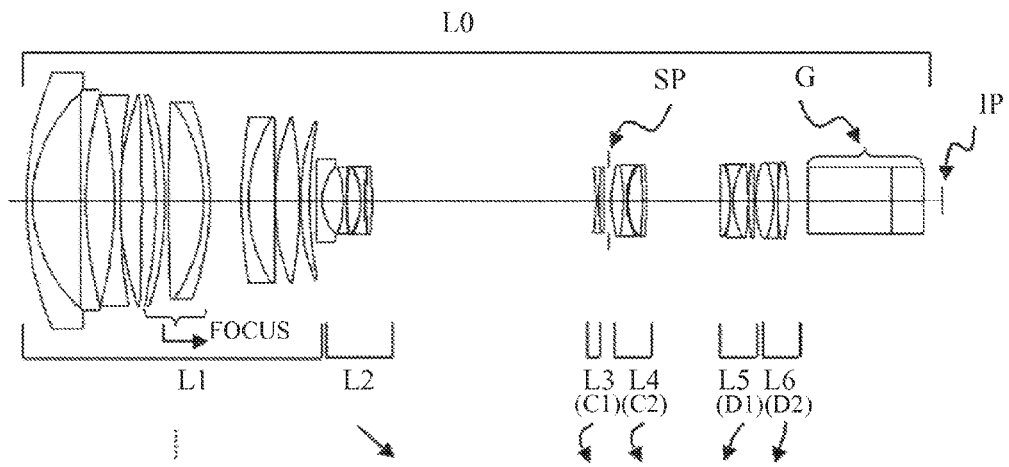
FIG. 5A is a sectional view of a zoom lens that is Embodiment 3 of the present invention at a wide-angle end.
Figure 5B:
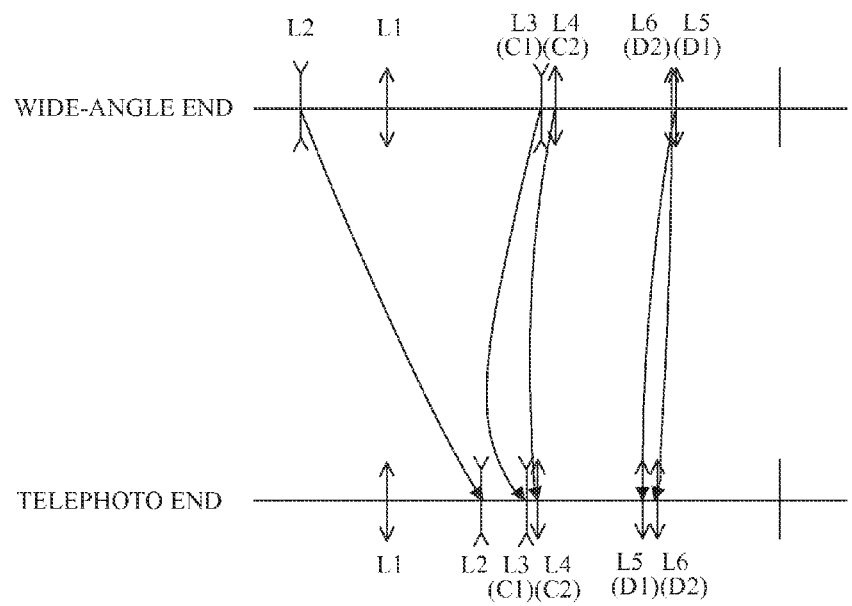
FIG. 5B shows movement loci of lens groups in the zoom lens of Embodiment 3.
Figure 6A:
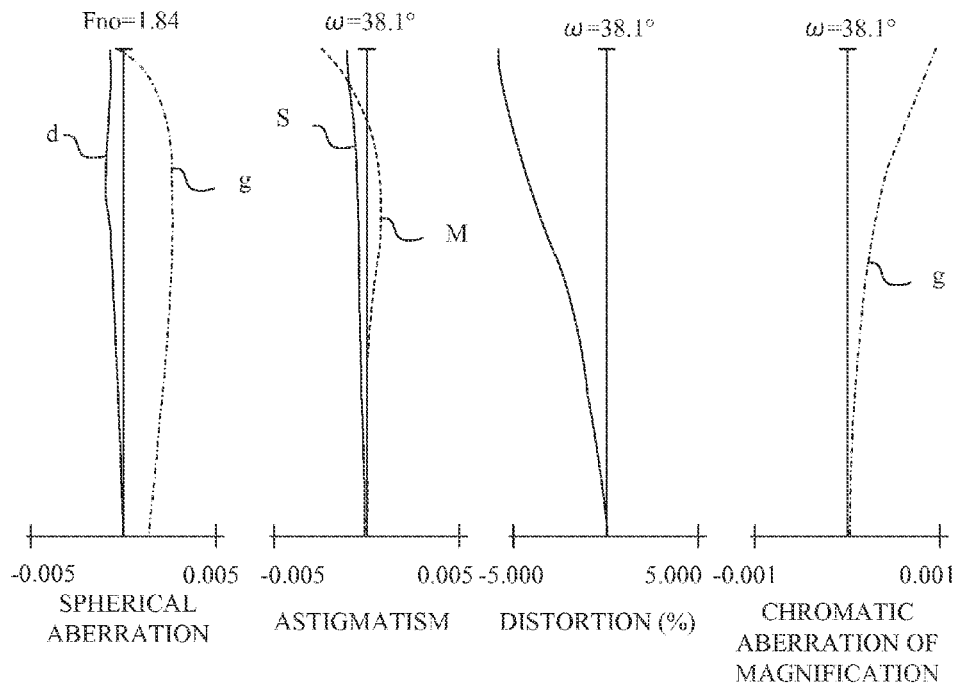
FIGS. 6A, 6B and 6C are respectively aberration charts of the zoom lens of Embodiment 3 at the wide-angle end, a middle zoom position and a telephoto end.
Figure 6B:
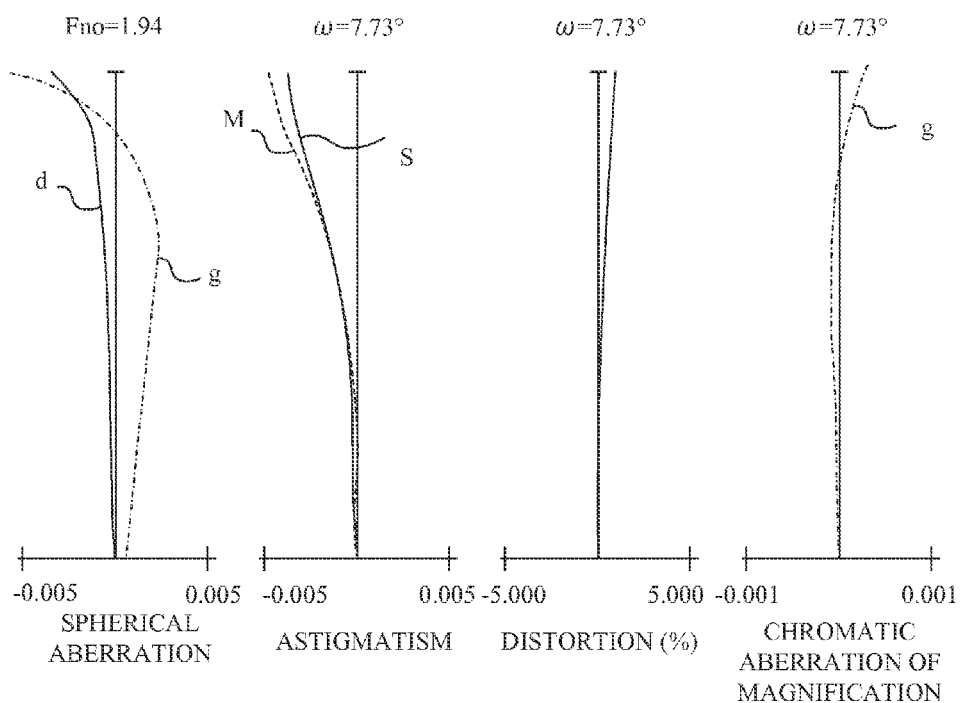
Figure 6C:
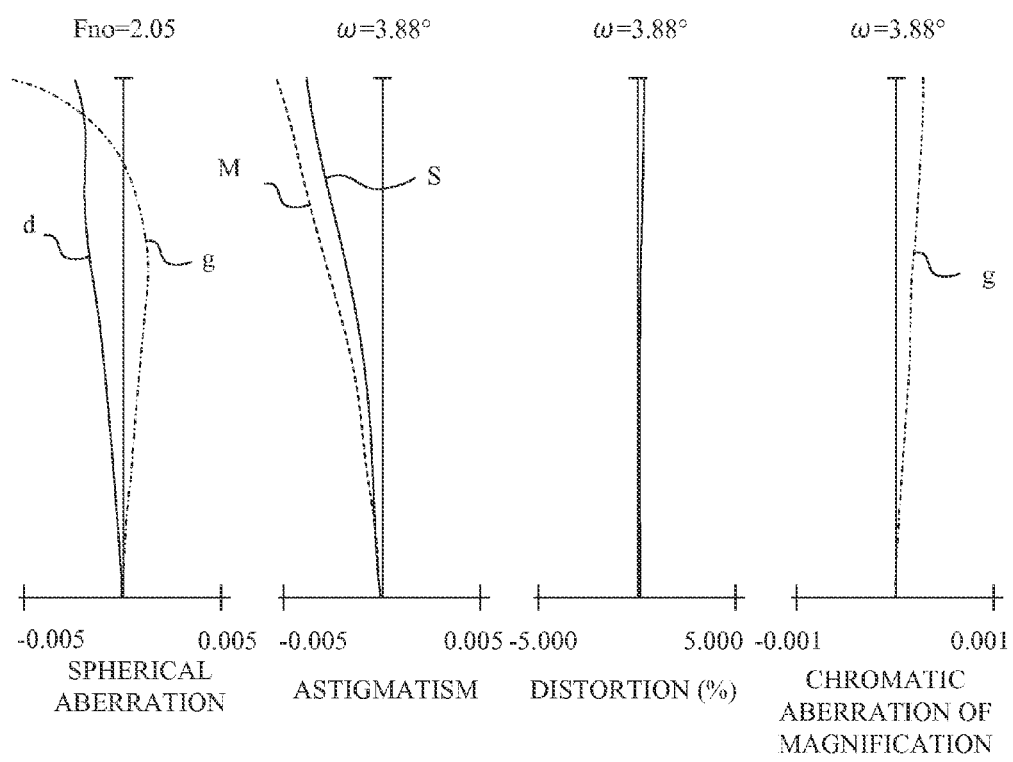

FIG. 5A is a sectional view of a zoom lens that is a third embodiment (Embodiment 3) at the wide-angle end, and FIG. 5B shows the movement loci of the respective lens groups. FIGS. 6A, 6B and 6C are respectively aberration charts of the zoom lens of Embodiment 3 at the wide-angle end, a middle zoom position and the telephoto end.

Figure 7A:
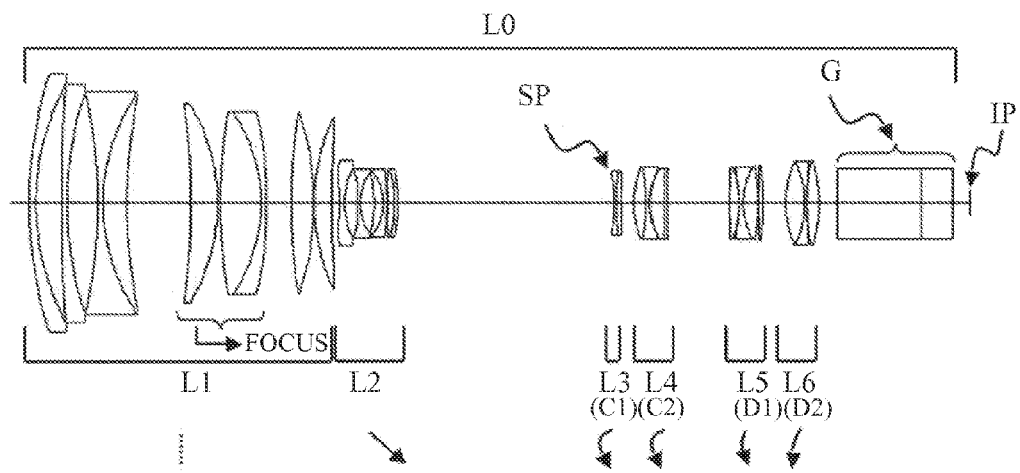
FIG. 7A is a sectional view of a zoom lens that is Embodiment 4 of the present invention at a wide-angle end.
Figure 7B:
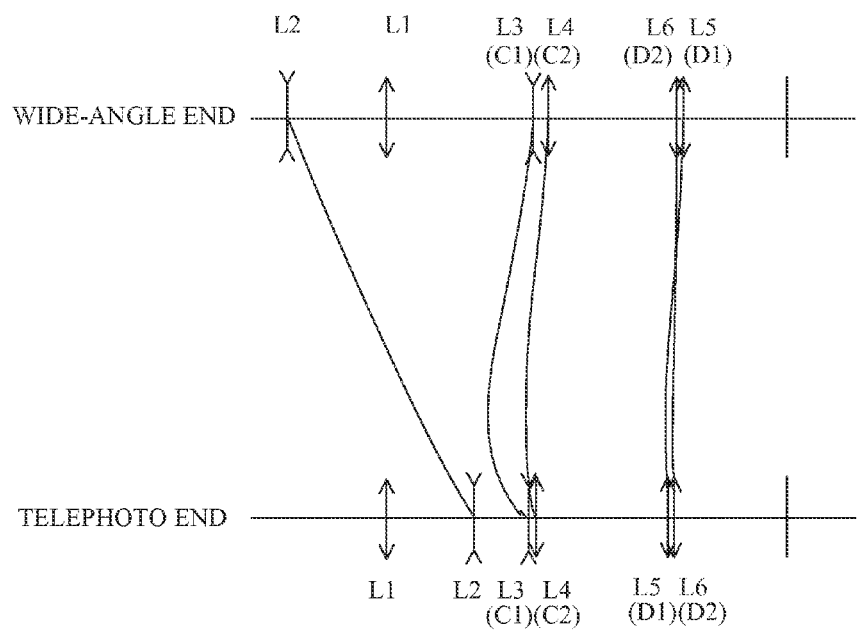
FIG. 7B shows movement loci of lens groups in the zoom lens of Embodiment 4.
Figure 8A:
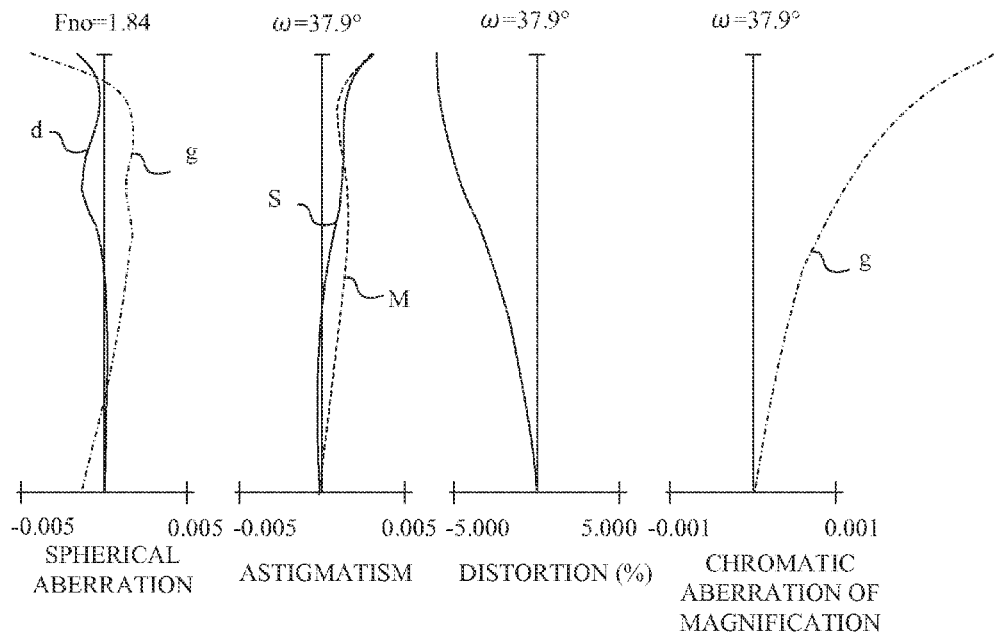
FIGS. 8A, 8B and 8C are respectively aberration charts of the zoom lens of Embodiment 4 at the wide-angle end, a middle zoom position and a telephoto end.
Figure 8B:
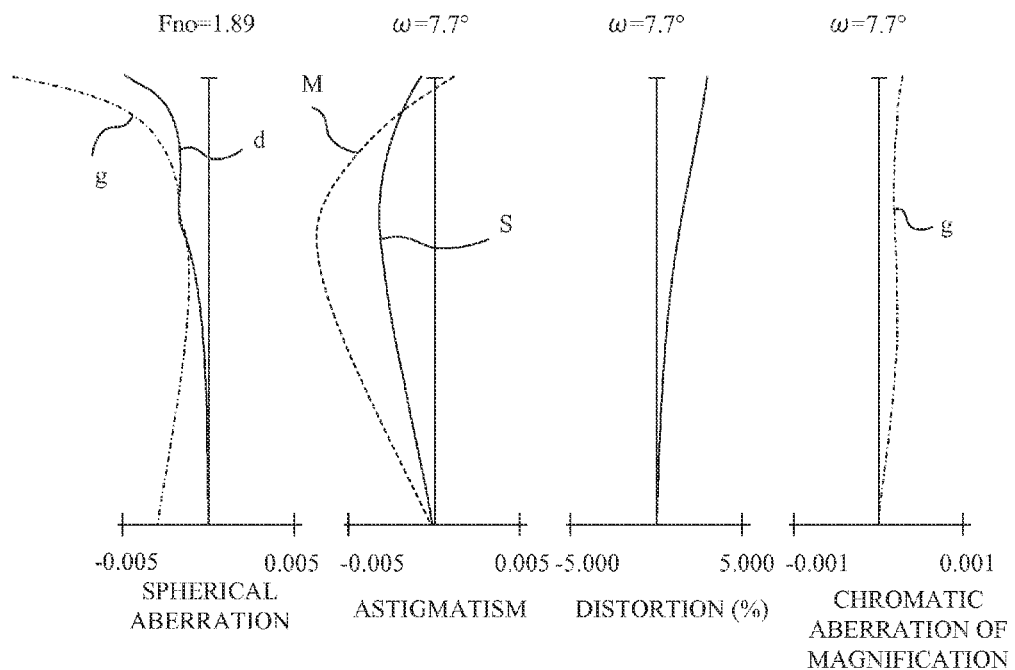
Figure 8C:
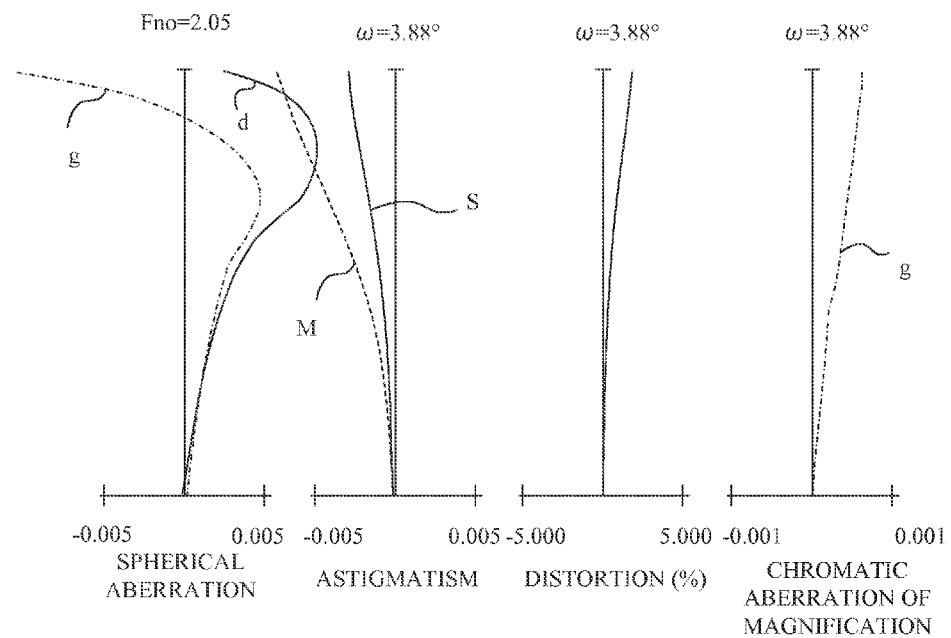

FIG. 7A is a sectional view of a zoom lens that is a fourth embodiment (Embodiment 4) at the wide-angle end, and FIG. 7B shows the movement loci of the respective lens groups. FIGS. 8A, 8B and 8C are respectively aberration charts of the zoom lens of Embodiment 4 at the wide-angle end, a middle zoom position and the telephoto end.

The above figures each show a sectional lens configuration, movement loci and aberrations when an object distance is infinity. FIGS. 1B, 3B, 5B and 7B show movement loci of principal points of the respective lens groups. In the sectional view of FIGS. 1A, 3A, 5A and 7A, the left side corresponds to an object side (front side), the right side corresponds to an image side (rear side), reference character L0 denotes the zoom lens, and reference character SP denotes the aperture (aperture stop) to decide the axial maximum light flux diameter at the wide-angle end.

The term "the aperture to decide the axial maximum light flux diameter" means an aperture to decide an F-number for an axial light flux (that is, a light flux whose principal rays proceed on the optical axis) when the object distance is infinity. In general zoom lenses, an aperture stop often has a role as the aperture SP. However, in zoom lenses including no aperture stop mechanism, the F-number is decided by part of a lens barrel or an outer diameter portion of a specific lens. In this case, the part of the lens barrel or the outer diameter portion of the specific lens is used as the aperture SP to decide the axial maximum light flux diameter.

In the sectional view of FIGS. 1A, 3A, 5A and 7A, reference character L1 denotes the first lens group having a positive lens power, L2 the second lens group having a negative refractive power, L3 the third lens group having a negative refractive power, L4 the fourth lens group having a positive refractive power, and L5 the fifth lens group having a positive refractive power. In the sectional views of FIGS. 1A, 5A and 7A, reference character L6 denotes a sixth lens group having a positive refractive power. Reference character G denotes an optical block including at least one of an optical filter, a face plate, a crystal low-pass filter, an infrared-cutting filter, a color separating prism and the like.

Reference character IP demotes an image plane where an image pickup surface of an image sensor (photoelectric conversion element) such as a CCD sensor or a CMOS sensor is placed when the zoom lens is used as an image taking optical system for video cameras or digital still cameras or where a film surface of a silver-halide film is placed when the zoom lens is used as an image taking optical system for silver-halide film cameras. Moreover, when the zoom lens is used for a projection optical system of image projection apparatuses (projectors), an image display element such as a liquid crystal panel is placed at the image plane. In addition, in each of the sectional views, arrows show schematic movement loci of the respective lens groups when zooming from the wide-angle end to the telephoto end is performed, and an arrow with letters "FOCUS" shows a movement direction of a focusing lens group when focusing on from an infinite object to a close distance object is performed.

In the aberration charts, reference characters d and g respectively denote aberrations (spherical aberration and chromatic aberration of magnification) for a d-line and aberrations for a g-line, and reference characters M and S respectively denote astigmatism in a sagittal image plane and astigmatism in a meridional image plane. Fno represents an F-number, and ω represents a half field angle. Moreover, the aberration charts show the spherical aberration and the astigmatism in a range of ±0.005 mm, distortion in a range of ±5% and the chromatic aberration of magnification in a range of ±0.001 mm. In each embodiment, the wide-angle end and the telephoto end correspond to zoom positions at which the lens group movable during the zooming reaches ends of its mechanical movable range on the optical axis.

Next, description is made of characteristics of the zoom lens of each embodiment. In general, in order to improve image quality in positive-lead type zoom lenses each constituted by, in order from an object side to an image side, five lens groups having positive, negative, negative, positive and positive refractive powers, it is important to well correct field curvature and astigmatism. In these zoom lenses, aberration correction is often made at their wide-angle end, telephoto end and zoom positions therebetween.

On the other hand, in order to design a zoom lens which moves multiple lens groups as magnification-varying lens groups during zooming with a priority on zoom efficiency, it is desirable to appropriately share a magnification-varying burden among the respective lens groups and to move the lens groups each having an appropriate power. Such sharing of the magnification-varying burden among the multiple lens groups enables provision of a same magnification ratio with smaller movement amounts of the lens groups as compared with a case of moving only one magnification-varying lens group, which facilitates miniaturization of the entire zoom lens and makes it possible to achieve a higher magnification ratio with small movement amounts of the lens groups.

As mentioned above, in order to improve image quality, it is important to well correct the field curvature and the astigmatism, which significantly affect imaging performance, so that insufficient correction thereof makes it difficult to provide a high spatial frequency in the entire zoom range. If only aiming to reduction of the aberrations, it is only necessary to reduce the power of each magnification-varying lens group and increase the movement amount thereof. However, such a method increases the movement amount of each magnification-varying lens group, which increases size of the entire zoom lens.

Thus, the zoom lens of each embodiment is characterized by being capable of easily correcting various aberrations while achieving an entirely compact configuration and a high zoom ratio.

Specifically, as shown in the sectional views of FIGS. 1A, 3A, 5A and 7A, the zoom lens L0 of each embodiment is characterized by including, in order from the object side to the image side, the first lens group L1 having a positive lens power, the second lens group L2 having a negative refractive power, the third lens group L3 having a negative refractive power, the fourth lens group L4 having a positive refractive power and the fifth lens group L5 having a positive refractive power. As shown in the sectional views of FIGS. 1A, 5A and 7A, the zoom lens L0 may include, further on the image side than the fifth lens group L5, the sixth lens group L6 having a positive refractive power.

In the zoom lens L0 of each embodiment, constituting a most-image side lens group by the lens group (fifth or sixth lens group) having a positive refractive power reduces an incident height of off-axis principal rays to the most-image side lens group, which reduces an outer diameter (effective diameter) of the most-image side lens group and thereby suppresses generation of field curvature and astigmatism. Moreover, in the zoom lens L0 of each embodiment, at least four lens groups are moved during the zooming, and at least two lens groups placed further on the image side than the aperture SP to decide the axial maximum light flux diameter at the wide-angle end are moved during the zooming. When the aperture SP is placed inside one lens group, the at least two lens groups include that one lens group.

Furthermore, the zoom lens L0 of each embodiment includes a C1 lens group and a C2 lens group which are adjacent to each other and are moved during the zooming. The C1 and C2 lens groups are moved so as to draw mutually different movement loci during the zooming, but are located further on a same side of the object and image sides at the telephoto end than their positions at the wide-angle end. The movement loci of the C1 and C2 lens groups have shapes such that a distance between the C1 and C2 lens groups becomes maximum at a zoom position other than the wide-angle and telephoto ends.

Each embodiment thus moves the C1 and C2 lens groups to the same side during the zooming from the wide-angle end to the telephoto end and thereby provides a same effect to the C1 and C2 lens groups in a magnification-varying function from the wide-angle end to the telephoto end. Moreover, each embodiment moves the C1 and C2 lens groups so as to cause them to draw the mutually different movement loci and thereby provides an aberration correction effect to both the C1 and C2 lens groups. Particularly, each embodiment increases the distance between the C1 and C2 lens groups at the zoom position other than the wide-angle and telephoto ends and thereby changes the incident heights of axial light rays to the C1 and C2 lens groups during the zooming, which reduces spherical aberration remaining at the zoom position other than the wide-angle and telephoto ends.

Moreover, as well as for the incident height of the axial light rays to the C2 lens group, each embodiment significantly changes an incident height of the off-axis principal rays to the C2 lens group and thereby corrects the field curvature by balancing an astigmatic difference between the C1 and C2 lens groups.

In addition, each embodiment provides, further on the image side than the aperture SP, a D1 lens group and a D2 lens group which are adjacent to each other and are moved during the zooming. At least one of the D1 and D2 lens groups is moved so as to be located further on the object side at the telephoto end than its position at the wide-angle end and such that a distance between the D1 and D2 lens groups at the telephoto end becomes longer than that at wide-angle end. Each embodiment moves the D1 and D2 lens groups in this manner during the zooming and thereby changes incident heights of the off-axis principal rays to the D1 and D2 lens groups during the zooming.

Although correction of the field curvature is made such that amounts thereof in the first and second lens groups become approximately equal to each other at the wide angle end and the telephoto end, there is a small difference therebetween and thereby a small amount of the field curvature remains. In particular, since more off-axis principal rays pass through peripheral areas of the first and second lens groups L1 and L2 at the wide-angle end than at the telephoto end, more amounts of the field curvature and astigmatism remain at the wide-angle end than at the telephoto end. Thus, in the zoom lens L0 of each embodiment, correction of the remaining field curvature and astigmatism is made by both the D1 and D2 lens groups placed further on the image side than the aperture SP.

Moreover, each embodiment moves the D1 and D2 lens groups further on the object side at the telephoto end than at the wide-angle end to place them closer to the aperture SP at the telephoto end than at the wide-angle end. This placement of the D1 and D2 lens groups reduces the incident height of the off-axis principal rays to the D1 and D2 lens groups (in particular, to the D1 lens group) and thereby reduces a total amount of the field curvature and a total amount of the astigmatism which are generated at the D1 and D2 lens groups at the telephoto end.

The zoom lens L0 of each embodiment prevents, by moving the D1 and D2 lens groups as described above, insufficient correction of the field curvature and astigmatism at the wide-angle end and excessive correction of the field curvature and astigmatism at the telephoto end, which appropriately reduces the field curvature and the astigmatism at both the wide-angle end and the telephoto end.

As described above, the zoom lens L0 of each embodiment moves the C1, C2, D1 and D2 lens groups during the zooming not only for performing the variation of magnification, but also for changing the distances thereamong to change the incident height of the principal rays thereto and thereby finely changing contribution amounts thereof to aberration correction depending on the zoom position. In other words, the zoom lens L0 of each embodiment causes the C1 and C2 lens groups having the above-described relation to reduce the aberrations remaining at the zoom position other than the wide-angle and telephoto ends while providing the same magnification-varying effect to the C1 and C2 lens groups, and causes the D1 and D2 lens groups having the above-described movement relation to reduce the aberrations at the wide-angle and telephoto ends.

The above-described configuration of the zoom lens L0 of each embodiment makes it possible to sufficiently reduce the field curvature and the astigmatism in the entire zoom range and thereby to provide a high quality image while miniaturizing the entire zoom lens L0.

Although the above-described configuration can achieve a zoom lens as a target of the present invention, it is desirable to have at least one of the following configurations and to satisfy at least one of the following conditions in order to provide a zoom lens having higher optical performance.

First, it is desirable that the D2 lens group be a most-image side lens group of the entire zoom lens. This configuration can also place the D1 lens group at a closer position to the image plane at the wide-angle end. Such placement of the D1 and D2 lens groups at the closer positions to the image plane makes it possible to cause the off-axis principal rays to pass through the peripheral areas of the D1 and D2 lens groups, which enables more effective correction of the field curvature and astigmatism remaining in the first and second lens groups L1 and L2 by both the D1 and D2 lens groups.

Moreover, it is desirable that, during the zooming from the wide-angle end to the telephoto end, the first lens group L1 be not moved and the second lens group L2 be moved to the image side. In addition, it is desirable that the third and fourth lens groups L3 and L4 be moved so as to draw movement loci convex toward the object side during the zooming from the wide-angle end to the telephoto end and be located further on the object side at the telephoto end than at the wide-angle end. Furthermore, it is desirable that the fifth lens group L5 be moved further on the object side at the telephoto end than at the wide-angle end.

In each embodiment, in the zoom lens L0 including, in order from the object side to the image side, the first to fifth lens groups L1 to L5 having positive, negative, negative, positive and positive refractive powers, the second lens group L2 having the negative refractive power is moved to the image side during the zooming from the wide-angle end to the telephoto end in order to provide to the second lens group L2 a role as a main magnification-varying lens. In addition, the third lens group L3 having the negative refractive power is moved in order to provide thereto a role as a compensator to compensate for variation of the image plane due to the variation of magnification. This configuration enables variation of magnification without moving the first lens group L1 whose lens diameter is likely to become comparatively large.

Moreover, it is desirable to use the third lens group L3 as the C1 lens group, to use the fourth lens group L4 as the C2 and D1 lens groups and to move the fourth lens group L4 having the positive refractive power so as to draw a movement locus convex toward the object side as well as the third lens group L3. This configuration makes it easy to cause the fourth lens group L4 to correct spherical aberration and field curvature generated in the third lens group L3 during the zooming. Furthermore, it is desirable to move the third and fourth lens groups L3 and L4 further on the object side at the telephoto end than at the wide-angle end, which makes it possible to change a light proceeding path at the wide-angle end and the telephoto end. This configuration facilitates well-balanced correction of field curvature generated in the second lens group L2 at the wide angle end and spherical aberration generated in the second lens group L2 at the telephoto end by using the third and fourth lens groups L3 and L4.

Furthermore, it is desirable to use the fifth lens group L5 as the D2 lens group and thereby to move the fifth lens group L5 further on the object side at the telephoto end than at the wide-angle end. This configuration reduces the incident height of the off-axis principal rays to the fifth lens group L5, which makes it possible to reduce amounts of field curvature and astigmatism generated in the fifth lens group L5. Moreover, moving the fifth lens group L5 during the zooming also makes it possible to cause the fifth lens group L5 to correct field curvature and astigmatism generated in the fourth lens group L4 at each zoom position.

In addition, it is possible to place the aperture SP further on the object side than the fourth lens group L4. This configuration makes it possible to relatively reduce the lens diameter of the first lens group L1, which facilitates further reduction of field curvature and astigmatism generated in the first lens group L1.

Furthermore, it is desirable to place the sixth lens group L6 having a positive refractive power further on the image side than the fifth lens group L5. In this case, it is possible to use the third lens group L3 as the C1 lens group, to use the fourth lens group L4 as the C2 lens group, to use the fifth lens group L5 as the D1 lens group and to use the sixth lens group L6 as the D2 lens group. Although the above-described configuration uses the fourth lens L4 as both the C2 and D1 lens groups, this configuration includes the sixth lens group L6 and thereby makes it possible to provide the role of the D1 lens group to the fifth lens group L5.

Providing the positive refractive power to the sixth lens group L6 makes it possible to share part of the refractive power of the fifth lens group L5 to the sixth lens group L6. This configuration facilitates reduction of the refractive power of the fifth lens group L5 and thereby makes it possible to reduce refractive powers (that is, to increase curvature radii) of respective lenses constituting the fifth lens group L5, which reduces an incident angle and an refractive angle of the off-axis principal rays passing through peripheral area of each lens and thereby facilitates further reduction of generation amounts of the field curvature and astigmatism.

In addition, it is desirable that, of the at least four lens groups to be moved during zooming, at least one lens group be moved mainly for aberration correction and have a demagnifying effect in the magnification-varying function. The demagnifying effect means that an absolute value of a ratio $|\beta T/\beta w|$ of a lateral magnification $\beta w$ of the lens group at the wide-angle end and a lateral magnification $\beta T$ thereof at the telephoto end is smaller than 1.

In general, in order to realize a compact and lightweight configuration of the zoom lens including multiple movable lens groups, it is desirable that the respective lens groups each having a magnifying effect be efficiently moved to achieve a desired zoom ratio. If a demagnifying lens group having a demagnifying effect is included in the multiple movable lens groups, zoom efficiency is reduced, so that it is necessary to increase a magnifying amount by other lens groups to cover a demagnifying amount by the demagnifying lens group. However, moving the lens groups with a priority on the zoom efficiency generates remaining aberration.

Hence, it is desirable to use at least one lens group of the at least four lens group to be moved during the zooming as the demagnifying lens group. The use of the demagnifying lens group provides a configuration which prioritizes effective aberration correction over the zoom efficiency.

As described above, each embodiment can achieve a zoom lens being capable of correcting the field curvature and the astigmatism well and thereby having high optical performance.

It is more desirable that each embodiment satisfy at least one of the following conditions in order to provide a higher quality image. In the following conditions, MD1 represents a movement amount of the D1 lens group during the zooming from the wide-angle end to the telephoto end. The movement amount of the D1 lens group during the zooming from the wide-angle end to the telephoto end is a positional change amount of the D1 lens group between the wide-angle end and the telephoto end, and more specifically a difference between a distance from a most-object side lens surface of the D1 lens group to the image plane at the wide-angle end and a distance from the most-object side lens surface thereof to the image plane at the telephoto end.

Moreover, MD2 represents a maximum movement amount of the D2 lens group during the zooming from the wide-angle end to the telephoto end. The maximum movement amount of the D2 lens group during the zooming from the wide-angle end to the telephoto end is a positional change amount of the D2 lens group from a most-object side position corresponding to the wide-angle end to a most-image side position corresponding to the telephoto end (or from a most-image side position corresponding to the wide-angle end to a most-object side position corresponding to the telephoto end).

Furthermore, M2 represents a movement amount of a most-movable lens group whose movement amount during the zooming from the wide-angle end to the telephoto end is maximum among those of the at least five lens groups, MC1 represents a movement amount of the C1 lens group during the zooming from the wide-angle end to the telephoto end, and MC2 represents a movement amount of the C2 lens group during the zooming from the wide-angle end to the telephoto end.

In addition, C12w represents a distance on the optical axis between the C1 and C2 lens groups at the wide-angle end, C12t represents a distance on the optical axis between the C1 and C2 lens groups at the telephoto end, and MaxC12 represents a maximum distance on the optical axis between the C1 and C2 lens groups during the zooming from the wide-angle end to the telephoto end. Moreover, $\phi C1$ represents a refractive power of the C1 lens group, and $\phi C12$ represents a combined refractive power of the C1 and C2 lens groups at the wide-angle end. Furthermore, $\beta wd$ and $\beta Td$ respectively represent lateral magnifications of a strongest-demagnifying lens group providing a strongest demagnifying effect at the wide-angle end and the telephoto end, $\beta wC1$, $\beta wC2$, $\beta wD1$, $\beta wD2$ respectively represent lateral magnifications of the C1, C2, D1 and D2 lens groups at the wide-angle end, $\beta TC1$, $\beta TC2$, $\beta TD1$, $\beta TD2$ respectively represent lateral magnifications of the C1, C2, D1 and D2 lens groups at the telephoto end, and Z represents a zoom ratio of the zoom lens.

$$1.2 < |MD1/MD2| < 20.0 \quad (1)$$

$$0.02 < |MD1/M2| < 0.50 \quad (2)$$

$$0.05 < |MaxC12/(M2 \times C12w/C12t)| < 0.50 \quad (3)$$

$$0.010 < |MC1/M2| < 0.200 \quad (4)$$

$$0.010 < |MC2/M2| < 0.200 \quad (5)$$

$$0.8 < |\phi C1/\phi C12| < 3.0 \quad (6)$$

$$0.00 < |\beta Td/(\beta wd \times Z)| < 0.20 \quad (7)$$

$$0.05 < |\beta TC1/(\beta wC1 \times Z)| < 0.50 \quad (8)$$

$$0.05 < |\beta TC2/(\beta wC2 \times Z)| \quad (9)$$

$$0.00 < |\beta TD1/(\beta wD1 \times Z)| < 0.50 \quad (10)$$

$$0.00 < |\beta TD2/(\beta wD2 \times Z)| < 0.50 \quad (11)$$

Technical meaning of each of the above conditions is as follows.

The condition (1) relates to the movement amounts of the D1 and D2 lens groups during the zooming. A value of |MD1/MD2| beyond the upper limit of the condition (1) makes the movement amount of the D1 lens group excessively large compared with that of the D2 lens group or makes the movement amount of the D2 lens group excessively small compared with that of the D1 lens group. The excessively large movement amount of the D1 lens group makes it necessary to increase spaces at front and rear of the D1 lens group in order to prevent interference of the D1 lens group with other lens groups placed in front and rear thereof at the wide-angle and telephoto ends, which increases the size of the entire zoom lens. The excessively small movement amount of the D2 lens group makes the correction effect of the D1 and D2 lens groups for correcting the field curvature and the astigmatism insufficient. On the other hand, a value of |MD1/MD2| below the lower limit of the condition (1) makes the movement amount of the D1 lens group excessively small compared with that of the D2 lens group or causes the D1 and D2 lens groups to almost integrally move, which makes it difficult to correct the field curvature and the astigmatism at the wide-angle and telephoto ends and makes the correction effect for the field curvature and the astigmatism between the D1 and D2 lens groups insufficient.

The condition (2) relates to a ratio to of the movement amount of the D1 lens group during the zooming and the movement amount of the most-movable lens group (the second lens group L2 in each embodiment) whose movement amount during the zooming is the maximum. A value of |MD1/M2| beyond the upper limit of the condition (2) makes the movement amount of the D1 lens group excessively large, which makes it necessary to increase spaces at front and rear of the D1 lens group in order to prevent interference of the D1 lens group with other lens groups placed in front and rear thereof at the wide-angle and telephoto ends and thereby increases the size of the entire zoom lens. On the other hand, a value of |MD1/M2| below the lower limit of the condition (2) makes the movement amount of the D1 lens group excessively small, which makes it difficult to correct the field curvature and the astigmatism at the wide-angle and telephoto ends with good balance; for example, the field curvature and the astigmatism are insufficiently corrected at the wide-angle end or excessively corrected at the telephoto end.

The condition (3) relates to the maximum distance between the C1 and C2 lens groups during the zooming. A value of

|MaxC12/(M2×C12w/C12t)| beyond the upper limit of the condition (3) makes the distance between the C1 and C2 lens groups excessively large at a zoom position other than the wide-angle and telephoto ends or makes the distance between the C1 and C2 lens groups at the telephoto end excessively large compared with at the wide-angle end. The excessively large distance between the C1 and C2 lens groups at the zoom position other than the wide-angle and telephoto ends makes it necessary to increase spaces at front and rear of the C1 and C2 lens groups in order to prevent interference of the C1 and C2 lens groups with other lens groups placed in front and rear thereof during the zooming, which increases the size of the entire zoom lens. The excessively large distance between the C1 and C2 lens groups at the telephoto end compared with at the wide-angle end causes a large difference between the correction effect for the field curvature and the astigmatism between the C1 and C2 lens groups at the wide-angle and telephoto ends, which makes it difficult to correct the field curvature and the astigmatism at the wide-angle and telephoto ends with good balance. On the other hand, a value of |MaxC12/(M2×C12w/C12t)| below the lower limit of the condition (3) makes a change amount of the distance between the C1 and C2 lens groups small or makes the distance between the C1 and C2 lens groups at the wide-angle end excessively large compared with at the telephoto end. The small distance between the C1 and C2 lens groups reduces change of a light proceeding path during the zooming, which decreases the correction effect for the field curvature and the astigmatism between the C1 and C2 lens groups. Moreover, the excessively large distance between the C1 and C2 lens groups at the wide-angle end compared with at the telephoto end provides a significantly off-balance aberration correction effect to the C1 and C2 lens groups at the wide-angle end and telephoto end, which makes it difficult to correct the field curvature and the astigmatism at the wide-angle and telephoto ends with good balance.

The condition (4) relates to a ratio of the movement amount of the C1 lens group during the zooming and the movement amount of the above-mentioned most-movable lens group (the second lens group L2 in each embodiment). The condition (5) relates to a ratio of the movement amount of the C2 lens group during the zooming and the movement amount of the most-movable lens group. A value of |MC1/M2| beyond the upper limit of the condition (4) and a value of |MC2/M2| beyond the upper limit of the condition (5) make the movement amounts of the C1 and C2 lens groups during the zooming from the wide-angle end to the telephoto end excessively large, which makes it necessary to increase spaces at front and rear of the C1 and C2 lens groups in order to prevent interference of the C1 and C2 lens groups with other lens groups placed in front and rear thereof during the zooming and thereby increases the size of the entire zoom lens. On the other hand, a value of |MC1/M2| below the lower limit of the condition (4) and a value of |MC2/M2| below the lower limit of the condition (5) make the movement amounts of the C1 and C2 lens groups during the zooming from the wide-angle end to the telephoto end excessively small. The small movement amounts of the C1 and C2 lens groups reduce change of light passing positions at their lens surfaces with the movement thereof, which decreases a correction effect of the C1 and C2 lens groups for correcting aberration variation during the zooming and thereby makes it difficult to correct the field curvature and the astigmatism at the wide-angle and telephoto ends with good balance.

The condition (6) relates to a ratio of the refractive power of the C1 lens group and the combined refractive power of the C1 and C2 lens groups. A value of |φC1/φC12| beyond the upper limit of the condition (6) makes the refractive power of the C1 lens group excessively strong compared with the combined refractive power of the C1 and C2 lens groups. The excessively strong refractive power of the C1 lens group increases spherical aberration generated in the C1 lens group, which makes it difficult to correct the spherical aberration and the field curvature between the C1 and C2 lens groups with good balance. On the other hand, a value of |φC1/φC12| below the lower limit of the condition (6) makes the refractive power of the C1 lens group excessively weak compared with the combined refractive power of the C1 and C2 lens groups. The excessively weak refractive power of the C1 lens group increases the movement amount of the C1 lens group, which increases the size of the entire zoom lens.

The condition (7) relates to a demagnification amount of the strongest-demagnifying lens group having a strongest demagnifying effect during the zooming from the wide-angle end to the telephoto end. A value of |βTd/(βwd×Z)| beyond the upper limit of the condition (7) means a configuration is achieved in which all the lens groups respectively provide a small demagnification amount and thereby variation of magnification is effectively performed. However, such a configuration generates large amounts of remaining field curvature and astigmatism between the lens groups movable during the zooming and thereby causes insufficient correction thereof. On the other hand, a value of |βTd/(βwd×Z)| below the lower limit of the condition (7) means that a desired magnification amount cannot be provided, so that the value of |βTd/(βwd×Z)| never becomes lower than the lower limit.

The conditions (8) to (11) relate to sharing amounts of the magnification-varying burden (hereinafter each referred to as "a magnification-varying sharing amount) of the C1, C2, D1 and D2 lens groups. A value of |βTC1/(βwC1×Z)| beyond the upper limit of the condition (8), a value of |βTD1/(βwD1×Z)| beyond the upper limit of the condition (10) and a value of |βTD2/(βwD2×Z)| beyond the upper limit of the condition (11) increase the magnification-varying sharing amounts of the respective lens groups, which increases magnification-varying efficiency (zoom efficiency). However, the increase of the magnification-varying efficiency is not necessarily advantageous for aberration correction, that is, may make it difficult to perform a well-balanced aberration correction. Specifically, the spherical aberration, the field curvature and the astigmatism remain between the lens groups, which causes insufficient correction thereof. Thus, the values of |βTC1/(βwC1×Z)|, |βTD1/(βwD1×Z)| and |βTD2/(βwD2×Z)| beyond their corresponding upper limits of the conditions (8), (10) and (11) mean that the C1, C2, D1 and D2 lens groups are moved without a priority on the aberration correction, which is undesirable.

On the other hand, a value of |βTC1/(βwC1×Z)| below the lower limit of the condition (8) and a value of |βTC2/(βwC2×Z)| below the lower limit of the condition (9) make the magnifying effects of the C1 and C2 lens groups excessively weak or makes the demagnifying effects thereof excessively strong. The excessively week magnifying effect and the excessively strong demagnifying effect make it necessary to provide a large magnifying effect to other lens groups in order to provide a desired zoom ratio, which results in insufficient correction of aberrations generated in each lens group to which the large magnifying effect is provided. In particular, the spherical aberration, the field curvature and the astigmatism undesirably remain. Moreover, a value of |βTD1/(βwD1×Z)| below the lower limit of the condition (10) and a value of |βTD2/(βwD2×Z)| below the lower limit of the condition

(11) mean that a desired magnification amount cannot be provided, so that these values never become lower than the corresponding lower limits.

It is more desirable to set the numerical ranges of the conditions (1) to (11) as follows:

$$1.5 < |MD1/MD2| < 17.0 \quad (1a)$$

$$0.03 < |MD1/M2| < 0.40 \quad (2a)$$

$$0.07 < |\text{Max}C12/(M2 \times C12w/C12t)| < 0.30 \quad (3a)$$

$$0.020 < |MC1/M2| < 0.150 \quad (4a)$$

$$0.020 < |MC2/M2| < 0.150 \quad (5a)$$

$$1.0 < |\phi C1/\phi C12| < 2.0 \quad (6a)$$

$$0.00 < |\beta Td/(\beta wd \times Z)| < 0.10 \quad (7a)$$

$$0.05 < |\beta TC1/(\beta wC1 \times Z)| < 0.30 \quad (8a)$$

$$0.08 < |\beta TC2/(\beta wC2 \times Z)| \quad (9a)$$

$$0.00 < |\beta TD1/(\beta wD1 \times Z)| < 0.25 \quad (10a)$$

$$0.00 < |\beta TD2/(\beta wD2 \times Z)| < 0.20 \quad (11a)$$

As described above, each embodiment provides a zoom lens in which variations of the field curvature and astigmatism are suppressed not only at the wide-angle and telephoto ends, but also at zoom positions other than the wide-angle and telephoto ends, and thereby achieves a zoom lens capable of reducing the field curvature and astigmatism in the entire zoom range and thus providing a high quality image.

Next, description is made of a detailed configuration of the zoom lens L0 of each embodiment.

Embodiment 1

The zoom lens L0 of Embodiment 1 shown in FIG. 1A includes, in order from the object side to the image side, the first lens group L1 having a positive refractive power, the second lens group L2 having a negative refractive power, the third lens group L3 having a negative refractive power, the fourth lens group L4 having a positive refractive power, the fifth lens group L5 having a positive refractive power and the sixth lens group L6 having a positive refractive power.

During the zooming from the wide-angle end to the telephoto end, the second to sixth lens groups L2 to L6 are moved on the optical axis so as to draw movement loci different from one another. Specifically, the second lens group L2 is moved to the image side. The third and fourth lens groups L3 and L4 are moved so as to draw movement loci convex toward the object side, that is, are once moved to the object side and then returned to the image side, and are located further on the object side at the telephoto end than their positions at the wide-angle end.

The fifth lens group L5 is moved to the object side. The sixth lens group L6 is moved so as to draw a movement locus convex toward the object side, that is, is once moved to the object side and then returned to the image side, and is located further on the object side at the telephoto end than its position at the wide-angle end.

In this embodiment, the aperture SP to decide the axial maximum light flux diameter at the wide-angle end corresponds to an aperture stop. The aperture stop SP is placed between the third and fourth lens groups L3 and L4. The aperture stop SP is moved integrally with the fourth lens group L4 during the zooming.

Focusing on from an infinite object to a finite distance object is performed by moving, to the image side, part of the first lens group L1, that is, a partial lens group constituted by a fifth lens to a seventh lens from the object side among lenses included in the first lens group L1. In this embodiment, the third lens group L3 corresponds to the C1 lens group, the fourth lens group L4 corresponds to the C2 lens group, the fifth lens group L5 corresponds to the D1 lens group, and the sixth lens group L6 corresponds to the D2 lens group.

FIG. 2B shows aberration charts at a middle zoom position when a focal length of the entire zoom lens is 5.76 mm.

Embodiment 2

The zoom lens L0 of Embodiment 2 shown in FIG. 3A includes, in order from the object side to the image side, the first lens group L1 having a positive refractive power, the second lens group L2 having a negative refractive power, the third lens group L3 having a negative refractive power, the fourth lens group L4 having a positive refractive power and the fifth lens group L5 having a positive refractive power.

During the zooming from the wide-angle end to the telephoto end, the second to fifth lens groups L2 to L5 are moved on the optical axis so as to draw movement loci different from one another. Specifically, the second lens group L2 is moved to the image side. The third to fifth lens groups L3 to L5 are moved so as to draw movement loci convex toward the object side, that is, are once moved to the object side and then returned to the image side, and are located further on the object side at the telephoto end than their positions at the wide-angle end.

In this embodiment, the aperture SP to decide the axial maximum light flux diameter at the wide-angle end corresponds to an aperture stop. The aperture stop SP is placed between the third and fourth lens groups L3 and L4. The aperture stop SP is moved integrally with the fourth lens group L4 during the zooming.

Focusing on from an infinite object to a finite distance object is performed by moving, to the image side, part of the first lens group L1, that is, a partial lens group constituted by a fifth lens to a seventh lens from the object side among lenses included in the first lens group L1. In this embodiment, the third lens group L3 corresponds to the C1 lens group, the fourth lens group L4 corresponds to the C2 and D1 lens groups, and the fifth lens group L5 corresponds to the D2 lens group.

FIG. 4B shows aberration charts at a middle zoom position when a focal length of the entire zoom lens is 5.75 mm.

Embodiment 3

The zoom lens L0 of Embodiment 3 shown in FIG. 5A has a same refractive power arrangement as that of Embodiment 1. During the zooming from the wide-angle end to the telephoto end, the second to sixth lens groups L2 to L6 are moved on the optical axis so as to draw movement loci different from one another. Specifically, the second lens group L2 is moved to the image side. The third and fourth lens groups L3 and L4 are moved so as to draw movement loci convex toward the object side, that is, are once moved to the object side and then returned to the image side, and are located further on the object side at the telephoto end than their positions at the wide-angle end. The fifth and sixth lens groups L5 and L6 are moved to the object side.

In this embodiment, the aperture SP to decide the axial maximum light flux diameter at the wide-angle end corresponds to an aperture stop. The aperture stop SP is placed between the third and fourth lens groups L3 and L4. The aperture stop SP is moved integrally with the fourth lens group L4 during the zooming.

Focusing on from an infinite object to a finite distance object is performed by moving, to the image side, part of the first lens group L1, that is, a partial lens group constituted by a fifth lens to a seventh lens from the object side among lenses included in the first lens group L1. In this embodiment, the third lens group L3 corresponds to the C1 lens group, the fourth lens group L4 corresponds to the C2 lens group, the fifth lens group L5 corresponds to the D1 lens group, and the sixth lens group L6 corresponds to the D2 lens group.

FIG. 6B shows aberration charts at a middle zoom position when a focal length of the entire zoom lens is 5.78 mm.

Embodiment 4

The zoom lens L0 of Embodiment 4 shown in FIG. 7A has a same refractive power arrangement as that of Embodiment 1. During the zooming from the wide-angle end to the telephoto end, the second to sixth lens groups L2 to L6 are moved on the optical axis so as to draw movement loci different from one another. Specifically, the second lens group L2 is moved to the image side. The third to sixth lens groups L3 to L6 are moved so as to draw movement loci convex toward the object side, that is, are once moved to the object side and then returned to the image side, and are located further on the object side at the telephoto end than their positions at the wide-angle end.

In this embodiment, the aperture SP to decide the axial maximum light flux diameter at the wide-angle end corresponds to an outer diameter portion of a most-object side lens (specific lens) of the third lens group L3.

Focusing on from an infinite object to a finite distance object is performed by moving part of the first lens group L1, that is, a partial lens group constituted by a fifth lens to a seventh lens from the object side among lenses included in the first lens group L1. In this embodiment, the third lens group L3 corresponds to the C1 lens group, the fourth lens group L4 corresponds to the C2 lens group, the fifth lens group L5 corresponds to the D1 lens group, and the sixth lens group L6 corresponds to the D2 lens group.

FIG. 8B shows aberration charts at a middle zoom position when a focal length of the entire zoom lens of 5.77 mm.

The zoom lens L0 of each embodiment may be modified by changing lenses having a focusing function and by adding an optical image stabilization function.

Embodiment 5

Figure 9:
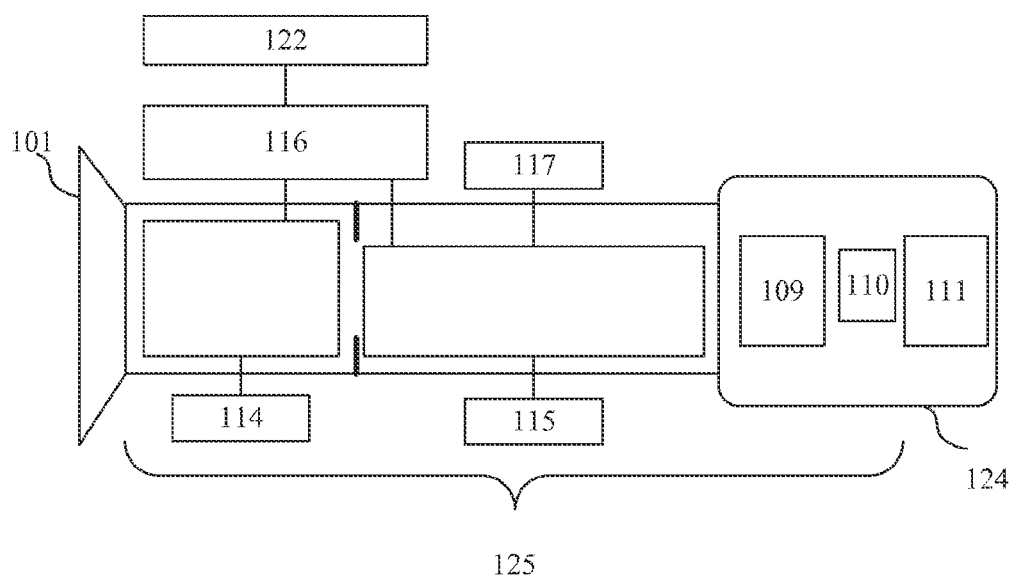
FIG. 9 is a schematic view of an image pickup apparatus using the zoom lens of any one of Embodiments 1 to 4.

FIG. 9 shows a configuration of an image pickup apparatus (television camera system) using the zoom lens of any one of Embodiments 1 to 4 as an image taking optical system. In FIG. 9, reference numeral 101 denotes the zoom lens, and 124 a camera. The zoom lens 101 is detachably attachable to the camera 124. Reference numeral 125 denotes the image pickup apparatus constituted by the camera 124 and the zoom lens 101 attached thereto. Reference numeral 114 and 115 denote driving mechanisms, such as helicoid mechanisms or cam mechanisms, which drive the lens groups in the zoom lens 101 on the optical axis.

Reference numerals 116 and 117 denote motors to electrically drive the driving mechanisms 114 and 115 and an aperture stop (not shown) corresponding to the aperture SP in Embodiments 1 to 4. In the zoom lens 101, though not shown, detectors such as encoders, potentiometers or photo sensors are provided which detect positions of the respective lens groups on the optical axis and an aperture diameter of the aperture stop. Reference numeral 109 denotes a glass block including an optical filter, a color separating prism and the like. Reference numeral 110 denotes a solid state image sensor (photoelectric conversion element) such as a CCD sensor or a CMOS sensor which receives an object image formed by the zoom lens 101.

Moreover, reference numerals 111 and 122 denote CPUs that control various operations of the camera 124 and the zoom lens 101. The use of the zoom lens 101 with the camera 124 achieves an image pickup apparatus having high optical performance. The zoom lens of each embodiment can be used for other image pickup apparatuses such as digital still cameras, video cameras, monitoring cameras and silver-halide film cameras, and for optical apparatuses such as projectors.

Next, specific numerical values of Numerical Examples 1 to 4 respectively corresponding to Embodiments 1 to 4 are shown. In each numerical example, i represents a surface number counted from the object side, ri represents curvature radius of an i-th lens surface counted from the object side, and di represents thickness or aerial distance between the i-th lens surface and an (i+1)-th lens surface. Moreover, ndi and vdi respectively represent refractive index and Abbe number of a material of an i-th lens. Each numerical example shows a focal length, an F-number and a field angle in a state of focusing on an infinite object.

An aspheric shape of a lens surface is expressed by the following expression where R represents a paraxial curvature radius of the lens surface, X represents position (coordinate) on the optical axis when a light proceeding direction is defined as a positive direction, Y represents position (coordinate) in a direction orthogonal to the optical axis, k represents an eccentricity, and A4, A6, A8, A10 and A12 represent aspheric coefficients:

$$X = \frac{\left(\frac{H^2}{R}\right)}{\left\{1 + \sqrt{1-(1+k)\cdot\left(\frac{H}{R}\right)^2}\right\}} + A4 \cdot H^4 + A6 \cdot H^6 + A8 \cdot H^8 + A10 \cdot H^{10} + A12 \cdot H^{12}$$

In addition, "e±Z" represents "×10$^{±Z}$".

Table 1 shows various numerical values of the above-described conditions in each numerical example. Table 2 shows various numerical values necessary to calculate the values of the above-described conditions in each numerical example. In Table 2, βw2, βw3, βw4 βw5 and βw6 respectively represent lateral magnifications of the second, third, fourth, fifth and sixth lens groups at the wide-angle end, and βT2, βT3, βT4, βT5 and βT6 respectively represent lateral magnifications of the second, third, fourth, fifth and sixth lens groups at the telephoto end.

Numerical Example 1

| f = 1.00-11.50 mm Fno = 1.84-2.00 2ω = 75.9-7.76 | | | | | |
|---|---|---|---|---|---|
| Surface No. | r | d | nd | vd | Effective Diameter |
| 1 | 11.399 | 0.37 | 1.73400 | 51.5 | 14.30 |
| 2 | 7.598 | 3.60 | | | 12.49 |
| 3 | 406.719 | 0.32 | 1.69680 | 55.5 | 12.11 |

-continued

| | | | | | |
|---|---|---|---|---|---|
| 4 | 17.310 | 2.09 | | | 11.42 |
| 5 | −16.825 | 0.31 | 1.65160 | 58.5 | 11.36 |
| 6 | 30.152 | 0.02 | | | 11.41 |
| 7 | 19.219 | 1.27 | 1.80518 | 25.4 | 11.52 |
| 8 | −96.668 | 0.78 | | | 11.49 |
| 9 | −25.953 | 0.54 | 1.49700 | 81.5 | 11.39 |
| 10 | −19.233 | 0.19 | | | 11.37 |
| 11 | −157.627 | 1.99 | 1.49700 | 81.5 | 10.98 |
| 12 | −9.300 | 0.35 | 1.73800 | 32.3 | 10.90 |
| 13 | −13.807 | 1.73 | | | 10.90 |
| 14 | 60.247 | 0.37 | 1.72342 | 38.0 | 9.78 |
| 15 | 10.373 | 1.68 | 1.49700 | 81.5 | 9.78 |
| 16 | −64.280 | 0.02 | | | 9.83 |
| 17 | 15.449 | 1.61 | 1.43387 | 95.1 | 10.08 |
| 18 | −21.085 | 0.02 | | | 10.07 |
| 19 | 14.253 | 0.73 | 1.59282 | 68.6 | 9.68 |
| 20 | 41.853 | (Variable) | | | 9.61 |
| 21(Aspheric) | −47.079 | 0.29 | 1.43875 | 94.9 | 5.17 |
| 22 | 3.244 | 0.97 | | | 4.11 |
| 23(Aspheric) | 3876.803 | 0.19 | 1.43875 | 94.9 | 4.06 |
| 24 | 3.956 | 0.48 | | | 3.85 |
| 25 | 27.754 | 0.80 | 1.63980 | 34.5 | 3.86 |
| 26 | −3.418 | 0.19 | 1.59282 | 68.6 | 3.86 |
| 27 | 51.776 | 0.27 | | | 3.85 |
| 28(Aspheric) | −7.550 | 0.37 | 1.48749 | 70.2 | 3.85 |
| 29 | −5.296 | 0.24 | 1.80809 | 22.8 | 3.85 |
| 30 | −7.619 | (Variable) | | | 3.90 |
| 31 | −9.300 | 0.17 | 1.77250 | 49.6 | 3.40 |
| 32 | 17.959 | 0.28 | 1.84666 | 23.9 | 3.50 |
| 33 | 19665.136 | (Variable) | | | 3.55 |
| 34(STOP) | ∞ | 0.15 | | | 3.64 |
| 35(Aspheric) | 6.901 | 0.70 | 1.67003 | 47.2 | 3.82 |
| 36 | −7.564 | 0.19 | 1.49700 | 81.5 | 3.83 |
| 37 | 4.257 | 0.09 | | | 3.83 |
| 38 | 4.368 | 0.85 | 1.48749 | 70.2 | 3.87 |
| 39 | −10.598 | 0.18 | 1.90200 | 25.1 | 3.87 |
| 40 | −18.977 | (Variable) | | | 3.90 |
| 41 | −321.300 | 0.55 | 1.80809 | 22.8 | 4.04 |
| 42 | −6.495 | 0.02 | | | 4.07 |
| 43 | −8.666 | 0.19 | 1.90200 | 25.1 | 4.03 |
| 44 | 4.900 | 0.87 | 1.49700 | 81.5 | 4.07 |
| 45 | −13.504 | 0.02 | | | 4.16 |
| 46 | 18.057 | 0.29 | 1.80809 | 22.8 | 4.26 |
| 47 | −114.482 | (Variable) | | | 4.28 |
| 48 | 6.763 | 1.07 | 1.49700 | 81.5 | 4.34 |
| 49 | −5.512 | 0.18 | 1.90200 | 25.1 | 4.30 |
| 50 | 40.076 | 0.02 | | | 4.34 |
| 51 | 14.252 | 0.65 | 1.80809 | 22.8 | 4.37 |
| 52 | −9.434 | (Variable) | | | 4.36 |
| 53 | ∞ | 4.87 | 1.69680 | 55.5 | 3.77 |
| 54 | ∞ | 1.85 | 1.51633 | 64.1 | 2.52 |
| 55 | ∞ | | | | 1.99 |
| Image Plane | ∞ | | | | |

Aspheric Data 21-st surface

K = 2.32405e+002   A4 = 1.13029e−003   A6 = 3.20226e−004
A8 = −3.94467e−005   A10 = 2.76116e−006

23-rd surface

K = −8.88662e+011   A4 = −5.25856e−003   A6 = −1.45412e−003
A8 = 2.77227e−005   A10 = 7.18178e−006

28-th surface

K = −6.33115e+000   A4 = 3.73355e−003   A6 = 8.39469e−004
A8 = −5.48275e−007   A10 = −5.31597e−006

35-th surface

K = −8.19897e+000   A4 = 1.83639e−003   A6 = −1.70252e−004
A8 = 7.46824e−006

Lens Data
Zoom Ratio 11.50

| | | | | | |
|---|---|---|---|---|---|
| Focal Length | 1.00 | 1.32 | 1.86 | 2.82 | 4.87 |
| F-number | 1.84 | 1.86 | 1.87 | 1.89 | 1.90 |
| Field Angle | 37.94 | 30.50 | 22.75 | 15.43 | 9.10 |

-continued

| | | | | | |
|---|---|---|---|---|---|
| Image Height | 0.78 | 0.78 | 0.78 | 0.78 | 0.78 |
| Entire Lens Length | 55.44 | 55.44 | 55.44 | 55.44 | 55.44 |
| BF | 0.97 | 0.97 | 0.97 | 0.97 | 0.97 |
| d20 | 0.39 | 2.50 | 4.66 | 6.93 | 9.37 |
| d30 | 12.62 | 9.71 | 6.65 | 3.60 | 0.97 |
| d33 | 0.19 | 0.57 | 0.99 | 1.47 | 1.77 |
| d40 | 4.95 | 4.97 | 5.01 | 4.89 | 4.43 |
| d47 | 0.21 | 0.60 | 0.98 | 1.35 | 1.72 |
| d52 | 1.08 | 1.10 | 1.16 | 1.21 | 1.20 |
| Entrance Pupil Position | 10.65 | 12.09 | 14.13 | 17.29 | 22.99 |
| Exit Pupil Position | 31.29 | 27.31 | 24.10 | 23.07 | 25.57 |
| FPP | 11.69 | 13.48 | 16.14 | 20.48 | 28.83 |
| RPP | −0.03 | −0.35 | −0.88 | −1.85 | −3.90 |

(FPP = Front Principal Point, RPP = Rear Principal Point)

| | | | | | |
|---|---|---|---|---|---|
| Focal Length | 5.76 | 6.97 | 8.70 | 10.19 | 11.50 |
| F-number | 1.91 | 1.91 | 1.91 | 1.92 | 2.00 |
| Field Angle | 7.70 | 6.38 | 5.12 | 4.38 | 3.88 |
| Image Height | 0.78 | 0.78 | 0.78 | 0.78 | 0.78 |
| Entire Lens Length | 55.44 | 55.44 | 55.44 | 55.44 | 55.44 |
| BF | 0.97 | 0.97 | 0.97 | 0.97 | 0.97 |
| d20 | 10.00 | 10.66 | 11.32 | 11.73 | 12.01 |
| d30 | 0.51 | 0.22 | 0.19 | 0.37 | 0.61 |
| d33 | 1.70 | 1.49 | 1.05 | 0.61 | 0.20 |
| d40 | 4.25 | 4.03 | 3.77 | 3.60 | 3.47 |
| d47 | 1.81 | 1.90 | 1.99 | 2.04 | 2.07 |
| d52 | 1.18 | 1.16 | 1.12 | 1.10 | 1.08 |
| Entrance Pupil Position | 25.26 | 28.17 | 32.09 | 35.17 | 37.63 |
| Exit Pupil Position | 27.22 | 29.63 | 33.22 | 36.27 | 38.87 |
| FPP | 32.29 | 36.83 | 43.14 | 48.30 | 52.62 |
| RPP | −4.79 | −5.99 | −7.73 | −9.21 | −10.53 |

Maximum movement amount of each lens group and focal length of the entire zoom lens at the maximum movement amount

| Group | Maximum movement amount | f |
|---|---|---|
| 2 | 11.62 | 11.50 |
| 3 | −2.73 | 4.18 |
| 4 | −1.22 | 3.27 |
| 5 | −1.86 | 11.50 |
| 6 | −0.13 | 3.44 |

3-4 groups maximum distance = 1.77 (f = 4.72)

Lens Group data

| Group | Start Surface | Focal length | Group Length | FPP | RPP |
|---|---|---|---|---|---|
| 1 | 1 | 10.66 | 17.99 | 12.95 | 6.97 |
| 2 | 21 | −3.85 | 3.82 | 0.56 | −2.50 |
| 3 | 31 | −12.64 | 0.45 | −0.01 | −0.25 |
| 4 | 34 | 8.21 | 2.16 | 0.40 | −1.07 |
| 5 | 41 | 37.13 | 1.95 | 2.31 | 1.18 |
| 6 | 48 | 8.58 | 1.92 | 0.68 | −0.56 |
| G | 53 | ∞ | 6.72 | 2.04 | −2.04 |

G denotes an optical block.

Single Lens Data

| Lens | Start Surface | Focal Length |
|---|---|---|
| 1 | 1 | −32.23 |
| 2 | 3 | −25.84 |
| 3 | 5 | −16.46 |
| 4 | 7 | 19.83 |
| 5 | 9 | 145.13 |
| 6 | 11 | 19.74 |
| 7 | 12 | −39.64 |
| 8 | 14 | −17.27 |
| 9 | 15 | 18.05 |
| 10 | 17 | 20.78 |
| 11 | 19 | 35.98 |
| 12 | 21 | −6.89 |
| 13 | 23 | −9.00 |

-continued

| | | |
|---|---|---|
| 14 | 25 | 4.77 |
| 15 | 26 | -5.38 |
| 16 | 28 | 34.40 |
| 17 | 29 | -22.33 |
| 18 | 31 | -7.87 |
| 19 | 32 | 21.02 |
| 20 | 35 | 5.47 |
| 21 | 36 | -5.44 |
| 22 | 38 | 6.44 |
| 23 | 39 | -26.63 |
| 24 | 41 | 8.11 |
| 25 | 43 | -3.41 |
| 26 | 44 | 7.33 |
| 27 | 46 | 19.12 |
| 28 | 48 | 6.27 |
| 29 | 49 | -5.31 |
| 30 | 51 | 7.04 |
| 31 | 53 | 0.00 |
| 32 | 54 | 0.00 |

Numerical Example 2 f = 1.00-11.50 mm Fno = 1.84-2.05 2ω = 75.9-7.76

| Surface No. | r | d | nd | νd | Effective Diameter |
|---|---|---|---|---|---|
| 1 | 12.499 | 0.37 | 1.73400 | 51.5 | 13.95 |
| 2 | 7.882 | 3.03 | | | 12.22 |
| 3 | -586.846 | 0.32 | 1.69680 | 55.5 | 12.12 |
| 4 | 18.673 | 1.88 | | | 11.45 |
| 5 | -19.114 | 0.31 | 1.65160 | 58.5 | 11.41 |
| 6 | 26.551 | 0.02 | | | 11.38 |
| 7 | 18.308 | 1.22 | 1.80518 | 25.4 | 11.47 |
| 8 | -152.066 | 0.98 | | | 11.44 |
| 9 | -21.010 | 0.54 | 1.49700 | 81.5 | 11.34 |
| 10 | -16.691 | 0.19 | | | 11.33 |
| 11 | -114.958 | 2.00 | 1.49700 | 81.5 | 10.88 |
| 12 | -9.174 | 0.35 | 1.73800 | 32.3 | 10.79 |
| 13 | -13.845 | 1.73 | | | 10.79 |
| 14 | 75.440 | 0.37 | 1.72342 | 38.0 | 9.94 |
| 15 | 10.782 | 1.75 | 1.49700 | 81.5 | 9.68 |
| 16 | -57.433 | 0.02 | | | 9.75 |
| 17 | 16.076 | 1.75 | 1.43387 | 95.1 | 9.96 |
| 18 | -19.289 | 0.02 | | | 9.94 |
| 19 | 12.978 | 0.79 | 1.59282 | 68.6 | 9.56 |
| 20 | 37.410 | (Variable) | | | 9.48 |
| 21(Aspheric) | -24.210 | 0.29 | 1.43875 | 94.9 | 5.03 |
| 22 | 2.994 | 1.02 | | | 3.95 |
| 23(Aspheric) | 65309.889 | 0.19 | 1.43875 | 94.9 | 3.90 |
| 24 | 4.150 | 0.42 | | | 3.75 |
| 25 | 21.733 | 0.85 | 1.63980 | 34.5 | 3.76 |
| 26 | -3.388 | 0.19 | 1.59282 | 68.6 | 3.77 |
| 27 | -31.461 | 0.19 | | | 3.78 |
| 28(Aspheric) | -6.784 | 0.37 | 1.48749 | 70.2 | 3.77 |
| 29 | -7.624 | 0.24 | 1.80809 | 22.8 | 3.76 |
| 30 | -12.029 | (Variable) | | | 3.78 |
| 31 | -9.092 | 0.17 | 1.77250 | 49.6 | 3.58 |
| 32 | 45.048 | 0.28 | 1.84666 | 23.9 | 3.69 |
| 33 | -35.942 | (Variable) | | | 3.74 |
| 34(Stop) | ∞ | 0.15 | | | 3.84 |
| 35(Aspheric) | 7.398 | 0.70 | 1.67003 | 47.2 | 4.00 |
| 36 | -8.223 | 0.19 | 1.49700 | 81.5 | 4.01 |
| 37 | 4.345 | 0.04 | | | 3.98 |
| 38 | 4.324 | 0.85 | 1.48749 | 70.2 | 4.01 |
| 39 | -13.507 | 0.18 | 1.90200 | 25.1 | 4.00 |
| 40 | -27.890 | (Variable) | | | 4.01 |
| 41 | -45.397 | 0.55 | 1.80809 | 22.8 | 3.92 |
| 42 | -6.370 | 0.02 | | | 3.96 |
| 43 | -9.049 | 0.19 | 1.90200 | 25.1 | 3.92 |
| 44 | 5.180 | 0.87 | 1.49700 | 81.5 | 3.96 |
| 45 | -12.570 | 0.02 | | | 4.06 |
| 46 | 14.694 | 0.29 | 1.80809 | 22.8 | 4.16 |
| 47 | 4010.487 | 0.34 | | | 4.17 |
| 48 | 7.104 | 1.07 | 1.49700 | 81.5 | 4.21 |
| 49 | -5.068 | 0.18 | 1.90200 | 25.1 | 4.16 |
| 50 | 27.415 | 0.02 | | | 4.21 |
| 51 | 11.516 | 0.65 | 1.80809 | 22.8 | 4.25 |
| 52 | -9.592 | (Variable) | | | 4.25 |
| 53 | ∞ | 4.87 | 1.69680 | 55.5 | 3.69 |
| 54 | ∞ | 1.85 | 1.51633 | 64.1 | 2.49 |
| 55 | ∞ | | | | 1.98 |
| Image plane | ∞ | | | | |

Aspheric Data 21-st surface

K = -1.75707e+002  A4 = 2.56248e-003  A6 = 6.10175e-005
A8 = -2.75402e-005  A10 = 3.08271e-006  A12 = -4.33377e-008

23-rd surface

K = -8.88662e+011  A4 = -1.08297e-002  A6 = -1.16020e-003
A8 = -1.20390e-005  A10 = 1.24797e-005

28-th surface

K = -1.33275e+001  A4 = 2.12550e-003  A6 = 1.19289e-003
A8 = -9.61394e-006  A10 = -1.52263e-005  A12 = 8.75117e-007

35-th surface

K = -9.55076e+000  A4 = 1.86808e-003  A6 = -1.67099e-004
A8 = 5.37407e-006  A10 = 3.08933e-007  A12 = -3.18322e-008

Lens Data
Zoom Ratio 11.50

| | | | | | |
|---|---|---|---|---|---|
| Focal Length | 1.00 | 1.33 | 1.86 | 2.81 | 4.85 |
| F-number | 1.84 | 1.84 | 1.85 | 1.85 | 1.85 |
| Field Angle | 37.94 | 30.46 | 22.79 | 15.52 | 9.13 |
| Image Height | 0.78 | 0.78 | 0.78 | 0.78 | 0.78 |
| Entire Lens Length | 54.59 | 54.59 | 54.59 | 54.59 | 54.59 |
| BF | 0.98 | 0.98 | 0.98 | 0.98 | 0.98 |
| d20 | 0.39 | 2.65 | 4.88 | 7.13 | 9.46 |
| d30 | 12.83 | 9.91 | 6.91 | 3.84 | 1.01 |
| d33 | 0.20 | 0.71 | 1.26 | 1.88 | 2.30 |
| d40 | 4.19 | 4.30 | 4.44 | 4.56 | 4.59 |
| d52 | 1.08 | 1.13 | 1.22 | 1.30 | 1.34 |
| Entrance Pupil Position | 10.09 | 11.61 | 13.77 | 17.10 | 22.98 |
| Exit Pupil Position | 84.29 | 72.13 | 60.61 | 53.54 | 51.78 |
| FPP | 11.10 | 12.96 | 15.68 | 20.06 | 28.29 |
| RPP | -0.02 | -0.34 | -0.87 | -1.82 | -3.87 |
| Focal Length | 5.75 | 6.96 | 8.71 | 10.19 | 11.50 |
| F-number | 1.85 | 1.85 | 1.85 | 1.85 | 2.05 |
| Field Angle | 7.72 | 6.39 | 5.12 | 4.37 | 3.88 |
| Image Height | 0.78 | 0.78 | 0.78 | 0.78 | 0.78 |
| Entire Lens Length | 54.59 | 54.59 | 54.59 | 54.59 | 54.59 |
| BF | 0.98 | 0.98 | 0.98 | 0.98 | 0.98 |
| d20 | 10.06 | 10.67 | 11.29 | 11.66 | 11.92 |
| d30 | 0.50 | 0.19 | 0.21 | 0.47 | 0.79 |
| d33 | 2.22 | 1.94 | 1.35 | 0.75 | 0.20 |
| d40 | 4.58 | 4.56 | 4.53 | 4.50 | 4.48 |
| d52 | 1.34 | 1.33 | 1.32 | 1.31 | 1.31 |
| Entrance Pupil Position | 25.24 | 28.10 | 31.84 | 34.69 | 36.89 |
| Exit Pupil Position | 52.34 | 53.44 | 55.18 | 56.61 | 57.76 |
| FPP | 31.64 | 35.98 | 41.94 | 46.75 | 50.72 |
| RPP Point Position | -4.77 | -5.98 | -7.72 | -9.21 | -10.52 |

Maximum movement amount of each lens group and focal length of the entire zoom lens at the maximum movement amount

| Group | maximum movement amount | f |
|---|---|---|
| 2 | 11.52 | 11.50 |
| 3 | -2.76 | 4.70 |
| 4 | -0.66 | 4.70 |
| 5 | -0.26 | 5.36 |

3-4 groups maximum distance = 2.30 (f = 4.70)

-continued

Lens Group data

| Group | Start Surface | Focal length | Group Length | FPP | RPP |
|---|---|---|---|---|---|
| 1 | 1 | 10.38 | 17.64 | 12.46 | 7.00 |
| 2 | 21 | −3.70 | 3.77 | 0.55 | −2.39 |
| 3 | 31 | −16.86 | 0.45 | −0.10 | −0.35 |
| 4 | 34 | 9.01 | 2.10 | 0.30 | −1.11 |
| 5 | 41 | 7.19 | 4.21 | 2.20 | −0.49 |
| G | 53 | ∞ | 6.72 | 2.04 | −2.04 |

G denotes an optical block.

Single Lens Data

| Lens | Start Surface | Focal Length |
|---|---|---|
| 1 | 1 | −29.96 |
| 2 | 3 | −25.86 |
| 3 | 5 | −16.94 |
| 4 | 7 | 20.17 |
| 5 | 9 | 156.39 |
| 6 | 11 | 19.88 |
| 7 | 12 | −37.79 |
| 8 | 14 | −17.32 |
| 9 | 15 | 18.37 |
| 10 | 17 | 20.47 |
| 11 | 19 | 33.00 |
| 12 | 21 | −6.04 |
| 13 | 23 | −9.44 |
| 14 | 25 | 4.61 |
| 15 | 26 | −6.40 |
| 16 | 28 | −147.54 |
| 17 | 29 | −26.15 |
| 18 | 31 | −9.73 |
| 19 | 32 | 23.42 |
| 20 | 35 | 5.89 |
| 21 | 36 | −5.67 |
| 22 | 38 | 6.80 |
| 23 | 39 | −28.93 |
| 24 | 41 | 9.02 |
| 25 | 43 | −3.59 |
| 26 | 44 | 7.48 |
| 27 | 46 | 18.06 |
| 28 | 48 | 6.11 |
| 29 | 49 | −4.69 |
| 30 | 51 | 6.50 |
| 31 | 53 | 0.00 |
| 32 | 54 | 0.00 |

Numerical Example 3 f = 1.00-11.56 mm Fno = 1.84-2.05 2ω = 76.2~7.76

| Surface No. | r | d | nd | vd | Effective Diameter |
|---|---|---|---|---|---|
| 1 | 19.050 | 0.37 | 1.73400 | 51.5 | 14.53 |
| 2 | 8.567 | 2.79 | | | 12.47 |
| 3 | −5524.561 | 0.32 | 1.69680 | 55.5 | 12.40 |
| 4 | 24.435 | 1.65 | | | 11.93 |
| 5 | −22.355 | 0.31 | 1.65160 | 58.5 | 11.89 |
| 6 | 37.515 | 0.02 | | | 11.89 |
| 7 | 19.141 | 1.26 | 1.80518 | 25.4 | 11.99 |
| 8 | −173.547 | 0.82 | | | 11.96 |
| 9 | −28.887 | 0.54 | 1.49700 | 81.5 | 11.84 |
| 10 | −20.699 | 0.19 | | | 11.80 |
| 11 | 151.093 | 2.06 | 1.49700 | 81.5 | 11.23 |
| 12 | −10.330 | 0.35 | 1.73800 | 32.3 | 11.11 |
| 13 | −15.867 | 1.86 | | | 11.01 |
| 14 | 29.743 | 0.37 | 1.72342 | 38.0 | 9.41 |
| 15 | 9.323 | 1.53 | 1.49700 | 81.5 | 9.29 |
| 16 | −637.818 | 0.02 | | | 9.30 |
| 17 | 13.597 | 1.45 | 1.43387 | 95.1 | 9.38 |
| 18 | −26.304 | 0.02 | | | 9.35 |
| 19 | 13.026 | 0.55 | 1.59282 | 68.6 | 8.92 |
| 20 | 24.859 | (Variable) | | | 8.84 |
| 21(Aspheric) | 1326.768 | 0.29 | 1.59282 | 68.6 | 4.70 |
| 22 | 2.838 | 1.25 | | | 3.81 |
| 23 | −4.985 | 0.20 | 1.59282 | 68.6 | 3.75 |
| 24 | 31.037 | 0.02 | | | 3.79 |
| 25 | 20.453 | 0.80 | 1.63980 | 34.5 | 3.80 |
| 26 | −3.427 | 0.01 | 1.63555 | 22.7 | 3.81 |
| | | | | | θgF = 0.689 |
| 27 | −4.158 | 0.20 | 1.59282 | 68.6 | 3.81 |
| 28 | 16.953 | 0.06 | | | 3.82 |
| 29(Aspheric) | 14.537 | 0.38 | 1.57501 | 41.5 | 3.83 |
| 30 | −28.633 | (Variable) | | | 3.83 |
| 31 | −10.639 | 0.17 | 1.77250 | 49.6 | 3.56 |
| 32 | 21.149 | 0.28 | 1.84666 | 23.9 | 3.66 |
| 33 | −272.574 | (Variable) | | | 3.70 |
| 34(Stop) | ∞ | 0.15 | | | 3.82 |
| 35(Aspheric) | 6.456 | 0.71 | 1.67003 | 47.2 | 4.01 |
| 36 | −11.031 | 0.20 | 1.49700 | 81.5 | 4.02 |
| 37 | 4.235 | 0.11 | | | 3.98 |
| 38 | 4.367 | 0.86 | 1.48749 | 70.2 | 4.04 |
| 39 | −13.955 | 0.18 | 1.90200 | 25.1 | 4.03 |
| 40 | −29.525 | (Variable) | | | 4.05 |
| 41 | 134.968 | 0.56 | 1.80809 | 22.8 | 4.02 |
| 42 | −6.808 | 0.02 | | | 4.04 |
| 43 | −9.031 | 0.20 | 1.90200 | 25.1 | 4.00 |
| 44 | 4.775 | 0.88 | 1.49700 | 81.5 | 4.02 |
| 45 | −15.728 | 0.02 | | | 4.11 |
| 46 | 18.701 | 0.29 | 1.80809 | 22.8 | 4.20 |
| 47 | −114.351 | (Variable) | | | 4.21 |
| 48 | 6.777 | 1.08 | 1.49700 | 81.5 | 4.26 |
| 49 | −5.430 | 0.18 | 1.90200 | 25.1 | 4.21 |
| 50 | 30.821 | 0.02 | | | 4.26 |
| 51 | 12.691 | 0.66 | 1.80809 | 22.8 | 4.29 |
| 52 | −9.704 | (Variable) | | | 4.28 |
| 53 | ∞ | 4.90 | 1.69680 | 55.5 | 3.73 |
| 54 | ∞ | 1.86 | 1.51633 | 64.1 | 2.53 |
| 55 | ∞ | | | | 2.02 |
| Image plane | ∞ | | | | |

Aspheric Data

21-st surface

K = 2.84109e+005  A4 = 1.63521e−004  A6 = −5.72746e−005
A8 = −1.42625e−005  A10 = 3.02787e−006  A12 = −2.08263e−007

29-th surface

K = 2.72119e+001  A4 = 2.85392e−004  A6 = −2.18756e−005
A8 = −6.63792e−006  A10 = −2.24700e−007  A12 = −1.95956e−007

35-th surface

K = −7.55457e+000  A4 = 2.40144e−003  A6 = −2.27013e−004
A8 = 2.08390e−005  A10 = −1.91208e−006  A12 = 9.81961e−008

Lens Data
Zoom Ratio 11.56

| Focal Length | 1.00 | 1.34 | 1.87 | 2.82 | 4.87 |
|---|---|---|---|---|---|
| F-number | 1.84 | 1.88 | 1.90 | 1.91 | 1.93 |
| Field Angle | 38.10 | 30.35 | 22.73 | 15.53 | 9.15 |
| Image Height | 0.78 | 0.78 | 0.78 | 0.78 | 0.78 |
| Entire Lens Length | 53.31 | 53.31 | 53.31 | 53.31 | 53.31 |
| BF | 1.08 | 1.08 | 1.08 | 1.08 | 1.08 |
| d20 | 0.43 | 2.41 | 4.51 | 6.76 | 9.19 |
| d30 | 13.05 | 9.83 | 6.61 | 3.53 | 0.98 |
| d33 | 0.27 | 0.74 | 1.32 | 1.91 | 2.11 |
| d40 | 4.32 | 4.31 | 4.30 | 4.17 | 3.81 |
| d47 | 0.10 | 0.81 | 1.27 | 1.51 | 1.55 |
| d52 | 1.08 | 1.15 | 1.23 | 1.36 | 1.60 |
| Entrance Pupil Position | 9.60 | 11.03 | 13.10 | 16.37 | 22.28 |
| Exit Pupil Position | 90.63 | 51.81 | 41.03 | 40.15 | 51.86 |
| FPP | 10.62 | 12.41 | 15.06 | 19.39 | 27.62 |
| RPP | 0.08 | −0.26 | −0.79 | −1.74 | −3.79 |
| Focal Length | 5.78 | 7.01 | 8.78 | 10.27 | 11.56 |
| F-number | 1.94 | 1.96 | 1.97 | 1.98 | 2.05 |
| Field Angle | 7.73 | 6.38 | 5.11 | 4.37 | 3.88 |
| Image Height | 0.78 | 0.78 | 0.78 | 0.78 | 0.78 |
| Entire Lens Length | 53.31 | 53.31 | 53.31 | 53.31 | 53.31 |

-continued

| | | | | | |
|---|---|---|---|---|---|
| BF | 1.08 | 1.08 | 1.08 | 1.08 | 1.08 |
| d20 | 9.83 | 10.48 | 11.15 | 11.56 | 11.83 |
| d30 | 0.56 | 0.31 | 0.30 | 0.48 | 0.71 |
| d33 | 1.97 | 1.67 | 1.13 | 0.63 | 0.19 |
| d40 | 3.67 | 3.51 | 3.33 | 3.20 | 3.11 |
| d47 | 1.54 | 1.51 | 1.47 | 1.44 | 1.42 |
| d52 | 1.68 | 1.77 | 1.87 | 1.93 | 1.98 |
| Entrance Pupil Position | 24.60 | 27.55 | 31.40 | 34.34 | 36.61 |
| Exit Pupil Position | 60.02 | 74.22 | 103.32 | 141.01 | 191.10 |
| FPP | 30.95 | 35.23 | 40.93 | 45.36 | 48.88 |
| RPP | −4.70 | −5.93 | −7.70 | −9.19 | −10.49 |

Maximum movement amount of each lens group and focal length of the entire zoom lens at the maximum movement amount

| Group | maximum movement amount | f |
|---|---|---|
| 2 | 11.40 | 11.56 |
| 3 | −3.40 | 3.94 |
| 4 | −1.56 | 3.18 |
| 5 | −2.22 | 11.56 |
| 6 | −0.90 | 11.56 |

3-4 groups maximum distance = 2.15 (f = 4.17)

Lens Group data

| Group | Start Surface | Focal length | Group Length | FPP | RPP |
|---|---|---|---|---|---|
| 1 | 1 | 11.08 | 16.49 | 11.69 | 6.21 |
| 2 | 21 | −3.51 | 3.20 | 0.34 | −2.17 |
| 3 | 31 | −15.15 | 0.45 | −0.02 | −0.26 |
| 4 | 34 | 8.75 | 2.19 | 0.32 | −1.17 |
| 5 | 41 | 40.80 | 1.96 | 2.21 | 1.06 |
| 6 | 48 | 8.82 | 1.93 | 0.68 | −0.57 |
| G | 53 | ∞ | 6.76 | 2.06 | −2.06 |

G denotes an optical block.

Single Lens Data

| Lens | Start Surface | Focal Length |
|---|---|---|
| 1 | 1 | −21.43 |
| 2 | 3 | −34.76 |
| 3 | 5 | −21.37 |
| 4 | 7 | 21.28 |
| 5 | 9 | 143.34 |
| 6 | 11 | 19.48 |
| 7 | 12 | −40.94 |
| 8 | 14 | −18.80 |
| 9 | 15 | 18.45 |
| 10 | 17 | 20.84 |
| 11 | 19 | 45.21 |
| 12 | 21 | −4.78 |
| 13 | 23 | −7.20 |
| 14 | 25 | 4.62 |
| 15 | 26 | −30.52 |
| 16 | 27 | −5.59 |
| 17 | 29 | 16.73 |
| 18 | 31 | −9.10 |
| 19 | 32 | 22.96 |
| 20 | 35 | 6.15 |
| 21 | 36 | −6.11 |
| 22 | 38 | 6.91 |
| 23 | 39 | −29.22 |
| 24 | 41 | 7.95 |
| 25 | 43 | −3.41 |
| 26 | 44 | 7.45 |
| 27 | 46 | 19.71 |
| 28 | 48 | 6.23 |
| 29 | 49 | −5.06 |
| 30 | 51 | 6.83 |
| 31 | 53 | 0.00 |
| 32 | 54 | 0.00 |

Numerical Example 4 f = 1.00-11.50 mm Fno = 1.84-2.05 2ω = 75.9-7.76

| Surface No. | r | d | nd | vd | Effective Diameter |
|---|---|---|---|---|---|
| 1 | 25.644 | 0.37 | 1.73400 | 51.5 | 14.62 |
| 2 | 14.728 | 1.50 | | | 13.53 |
| 3 | 95.906 | 0.32 | 1.69680 | 55.5 | 13.42 |
| 4 | 20.618 | 1.77 | | | 12.65 |
| 5 | −29.608 | 0.31 | 1.69680 | 55.5 | 12.57 |
| 6 | 11.379 | 1.40 | 1.80809 | 22.8 | 11.96 |
| 7 | 31.250 | 3.72 | | | 11.88 |
| 8 | −42.861 | 1.55 | 1.43875 | 94.9 | 11.29 |
| 9 | −11.161 | 0.19 | | | 11.27 |
| 10 | 35.480 | 2.35 | 1.43875 | 94.9 | 9.96 |
| 11 | −9.348 | 0.35 | 1.73800 | 32.3 | 9.74 |
| 12 | −22.699 | 1.43 | | | 9.77 |
| 13 | 36.247 | 1.30 | 1.43387 | 95.1 | 9.94 |
| 14 | −16.496 | 0.02 | | | 9.94 |
| 15 | 11.901 | 1.01 | 1.43387 | 95.1 | 9.52 |
| 16 | 66.748 | (Variable) | | | 9.44 |
| 17(Aspheric) | −16.528 | 0.29 | 1.43875 | 94.9 | 4.81 |
| 18 | 4.542 | 0.74 | | | 3.99 |
| 19(Aspheric) | −37969.174 | 0.19 | 1.43875 | 94.9 | 3.92 |
| 20 | 3.368 | 0.81 | | | 3.58 |
| 21 | −6.591 | 0.53 | 1.63980 | 34.5 | 3.58 |
| 22 | −2.831 | 0.19 | 1.59282 | 68.6 | 3.60 |
| 23 | −15.968 | 0.05 | | | 3.73 |
| 24(Aspheric) | −27.116 | 0.37 | 1.48749 | 70.2 | 3.76 |
| 25 | −8.207 | 0.24 | 1.80809 | 22.8 | 3.76 |
| 26 | −9.090 | (Variable) | | | 3.79 |
| 27(Stop) | −9.862 | 0.17 | 1.77250 | 49.6 | 3.44 |
| 28 | 18.554 | 0.28 | 1.84666 | 23.9 | 3.54 |
| 29 | −350.197 | (Variable) | | | 3.59 |
| 30(Aspheric) | 5.564 | 0.70 | 1.67003 | 47.2 | 4.04 |
| 31 | −13.174 | 0.19 | 1.49700 | 81.5 | 4.04 |
| 32 | 3.977 | 0.03 | | | 3.98 |
| 33 | 3.956 | 0.85 | 1.48749 | 70.2 | 4.00 |
| 34 | −70.277 | 0.18 | 1.90200 | 25.1 | 3.99 |
| 35 | 73.954 | (Variable) | | | 3.98 |
| 36 | 105.872 | 0.55 | 1.80809 | 22.8 | 3.90 |
| 37 | −5.744 | 0.02 | | | 3.91 |
| 38 | −7.267 | 0.19 | 1.90200 | 25.1 | 3.86 |
| 39 | 4.028 | 0.87 | 1.49700 | 81.5 | 3.88 |
| 40 | −12.686 | 0.02 | | | 3.96 |
| 41 | 141.645 | 0.29 | 1.80809 | 22.8 | 4.03 |
| 42 | −17.629 | (Variable) | | | 4.06 |
| 43 | 6.307 | 1.07 | 1.49700 | 81.5 | 4.36 |
| 44 | −5.934 | 0.18 | 1.90200 | 25.1 | 4.33 |
| 45 | 26.349 | 0.02 | | | 4.37 |
| 46 | 14.472 | 0.65 | 1.80809 | 22.8 | 4.40 |
| 47 | −8.421 | (Variable) | | | 4.40 |
| 48 | ∞ | 4.87 | 1.69680 | 55.5 | 3.79 |
| 49 | ∞ | 1.85 | 1.51633 | 64.1 | 2.53 |
| 50 | ∞ | | | | 1.99 |
| Image plane | ∞ | | | | |

Aspheric Data 17-th surface

K = −4.58417e+001  A4 = 2.98573e−003  A6 = 4.25267e−004
A8 = −4.77503e−005  A10 = 2.76384e−006

19-th surface

K = −8.88685e+011  A4 = −1.06059e−002  A6 = −2.40310e−003
A8 = 3.05719e−004  A10 = 7.18875e−006

24-th surface

K = 4.51782e+001  A4 = 5.76799e−003  A6 = 6.33048e−004
A8 = −4.71469e−005  A10 = −5.32113e−006

30-th surface

K = −4.50787e+000  A4 = 1.63284e−003  A6 = −1.15061e−004
A8 = 6.47840e−007

-continued

| | | |
|---|---|---|
| Lens Data | | |
| Zoom Ratio 11.50 | | |

| | | | | | |
|---|---|---|---|---|---|
| Focal Length | 1.00 | 1.32 | 1.85 | 2.82 | 4.87 |
| F-number | 1.84 | 1.85 | 1.87 | 1.89 | 1.89 |
| Field Angle | 37.94 | 30.66 | 22.86 | 15.45 | 9.09 |
| Image Height | 0.78 | 0.78 | 0.78 | 0.78 | 0.78 |
| Entire Lens Length | 54.77 | 54.77 | 54.77 | 54.77 | 54.77 |
| BF | 0.97 | 0.97 | 0.97 | 0.97 | 0.97 |
| d16 | 0.45 | 2.60 | 4.76 | 6.98 | 9.34 |
| d26 | 12.58 | 9.90 | 6.85 | 3.67 | 0.91 |
| d29 | 0.70 | 1.02 | 1.42 | 1.90 | 2.20 |
| d35 | 3.63 | 3.69 | 3.86 | 3.98 | 3.88 |
| d42 | 1.32 | 1.40 | 1.62 | 1.87 | 2.04 |
| d47 | 1.08 | 1.15 | 1.26 | 1.35 | 1.39 |
| Entrance Pupil Position | 10.22 | 11.65 | 13.60 | 16.44 | 20.93 |
| Exit Pupil Position | 25.21 | 20.21 | 15.30 | 11.88 | 10.71 |
| FPP | 11.26 | 13.05 | 15.69 | 19.99 | 28.25 |
| RPP | −0.03 | −0.34 | −0.88 | −1.85 | −3.90 |
| Focal Length | 5.77 | 6.97 | 8.70 | 10.18 | 11.50 |
| F-number | 1.89 | 1.89 | 1.89 | 1.89 | 2.05 |
| Field Angle | 7.70 | 6.38 | 5.12 | 4.38 | 3.88 |
| Image Height | 0.78 | 0.78 | 0.78 | 0.78 | 0.78 |
| Entire Lens Length | 54.77 | 54.77 | 54.77 | 54.77 | 54.77 |
| BF | 0.97 | 0.97 | 0.97 | 0.97 | 0.97 |
| d16 | 9.96 | 10.59 | 11.24 | 11.63 | 11.90 |
| d26 | 0.45 | 0.19 | 0.24 | 0.48 | 0.79 |
| d29 | 2.10 | 1.85 | 1.32 | 0.81 | 0.34 |
| d35 | 3.80 | 3.70 | 3.56 | 3.47 | 3.40 |
| d42 | 2.05 | 2.05 | 2.04 | 2.02 | 2.01 |
| d47 | 1.39 | 1.38 | 1.36 | 1.34 | 1.33 |
| Entrance Pupil Position | 22.66 | 25.03 | 28.76 | 32.29 | 35.62 |
| Exit Pupil Position | 11.20 | 12.53 | 15.86 | 20.57 | 27.16 |
| FPP | 31.68 | 36.20 | 42.53 | 47.76 | 52.17 |
| RPP | −4.79 | −5.99 | −7.72 | −9.21 | −10.52 |

Maximum movement amount of each lens group and focal length of the entire zoom lens at the maximum movement amount

| Group | maximum movement amount | f |
|---|---|---|
| 2 | 11.45 | 11.50 |
| 3 | −2.80 | 4.44 |
| 4 | −1.31 | 4.06 |
| 5 | −1.04 | 5.77 |
| 6 | −0.31 | 4.72 |

3-4 groups maximum distance = 2.20 (f = 4.58)

Lens Group data

| Group | Start Surface | Focal length | Group Length | FPP | RPP |
|---|---|---|---|---|---|
| 1 | 1 | 10.38 | 17.60 | 12.55 | 6.92 |
| 2 | 17 | −3.84 | 3.43 | 0.39 | −2.55 |
| 3 | 27 | −13.90 | 0.45 | −0.01 | −0.26 |
| 4 | 30 | 8.59 | 1.96 | −0.11 | −1.34 |
| 5 | 36 | 54.36 | 1.95 | 3.36 | 2.29 |
| 6 | 43 | 8.04 | 1.92 | 0.69 | −0.56 |
| G | 48 | ∞ | 6.72 | 2.04 | −2.04 |

G denotes an optical block.

Single Lens Data

| Lens | Start Surface | Focal Length |
|---|---|---|
| 1 | 1 | −47.61 |
| 2 | 3 | −37.60 |
| 3 | 5 | −11.71 |
| 4 | 6 | 21.25 |
| 5 | 8 | 33.80 |
| 6 | 10 | 17.09 |
| 7 | 11 | −21.62 |
| 8 | 13 | 26.26 |
| 9 | 15 | 33.11 |
| 10 | 17 | −8.07 |
| 11 | 19 | −7.66 |
| 12 | 21 | 7.30 |
| 13 | 22 | −5.82 |
| 14 | 24 | 23.90 |
| 15 | 25 | −118.02 |
| 16 | 27 | −8.27 |
| 17 | 28 | 20.62 |
| 18 | 30 | 5.90 |
| 19 | 31 | −6.11 |
| 20 | 33 | 7.69 |
| 21 | 34 | −39.55 |
| 22 | 36 | 6.69 |
| 23 | 38 | −2.82 |
| 24 | 39 | 6.24 |
| 25 | 41 | 19.22 |
| 26 | 43 | 6.32 |
| 27 | 44 | −5.31 |
| 28 | 46 | 6.60 |
| 29 | 48 | 0.00 |
| 30 | 49 | 0.00 |

TABLE 1

| | NUMERICAL EXAMPLE 1 | NUMERICAL EXAMPLE 2 | NUMERICAL EXAMPLE 3 | NUMERICAL EXAMPLE 4 |
|---|---|---|---|---|
| CONDITION (1) | 14.55 | 1.99 | 2.47 | 3.04 |
| CONDITION (2) | 0.160 | 0.045 | 0.195 | 0.082 |
| CONDITION (3) | 0.159 | 0.198 | 0.134 | 0.093 |
| CONDITION (4) | 0.0338 | 0.0451 | 0.0826 | 0.0300 |
| CONDITION (5) | 0.0331 | 0.0452 | 0.0894 | 0.0617 |
| CONDITION (6) | 1.56 | 1.04 | 1.21 | 1.39 |
| CONDITION (7) | 0.0627 | 0.0510 | 0.0472 | 0.0170 |
| CONDITION (8) | 0.0894 | 0.0917 | 0.1030 | 0.0877 |
| CONDITION (9) | 0.127 | 0.155 | 0.086 | 0.573 |
| CONDITION (10) | 0.0627 | 0.1548 | 0.1912 | 0.0170 |
| CONDITION (11) | 0.0869 | 0.0510 | 0.0472 | 0.0711 |

TABLE 2

| | NUMERICAL EXAMPLE 1 | NUMERICAL EXAMPLE 2 | NUMERICAL EXAMPLE 3 | NUMERICAL EXAMPLE 4 |
|---|---|---|---|---|
| M2 | 11.62 | 11.52 | 11.40 | 11.45 |
| MD1 | −1.86 | −0.52 | −2.22 | −0.94 |
| MD2 | −0.13 | −0.26 | −0.90 | −0.31 |
| C12w | 0.19 | 0.20 | 0.27 | 0.70 |
| C12t | 0.20 | 0.20 | 0.19 | 0.34 |
| MaxC12 | 1.77 | 2.30 | 2.15 | 2.20 |
| MC1 | −0.39 | −0.52 | −0.94 | −0.34 |
| MC2 | −0.38 | −0.52 | −1.02 | −0.71 |
| φC1 | −0.07908 | −0.05933 | −0.06601 | −0.07194 |
| φC12 | 0.05083 | 0.05725 | 0.05477 | 0.05165 |
| Z | 11.50 | 11.50 | 11.56 | 11.50 |
| βw2 | −0.300 | −0.290 | −0.270 | −0.305 |
| βw3 | 0.386 | 0.459 | 0.435 | 0.408 |
| βw4 | −20.465 | −9.351 | −13.147 | −17.656 |
| βw5 | 0.181 | 0.077 | 0.260 | 0.264 |
| βw6 | 0.218 | | 0.225 | 0.166 |
| βt2 | −3.188 | −3.032 | −2.195 | −3.296 |
| βt3 | 0.397 | 0.484 | 0.518 | 0.412 |
| βt4 | −29.942 | −16.650 | 13.032 | −116.306 |
| βt5 | 0.131 | 0.045 | −0.575 | 0.052 |
| βt6 | 0.218 | | 0.122 | 0.136 |
| βt2/βw2 | 10.610 | 10.439 | 8.124 | 10.820 |
| βt3/βw3 | 1.028 | 1.054 | 1.191 | 1.009 |
| βt4/βw4 | 1.463 | 1.781 | −0.991 | 6.587 |
| βt5/βw5 | 0.721 | 0.587 | −2.211 | 0.196 |
| βt6/βw6 | 1.000 | | 0.545 | 0.817 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-146650, filed Jun. 29, 2012, which is hereby incorporated by reference herein in its entirety.

What is claimed is:

1. A zoom lens comprising at least five lens groups including in order from an object side to an image side:
a first lens group having a positive refractive power;
a second lens group having a negative refractive power;
a third lens group having a negative refractive power;
a fourth lens group having a positive refractive power; and
a fifth lens group having a positive refractive power,
wherein, of the at least five lens groups, at least four lens groups are moved during zooming on an optical axis, the at least four lens group including at least two lens groups placed further on the image side than an aperture to decide an axial maximum light flux diameter at a wide-angle end,
wherein, of the at least four lens groups to be moved during the zooming, a C1 lens group and a C2 lens group adjacent to each other are moved so as to draw mutually different loci during the zooming (a) such that a distance between the C1 and C2 lens groups becomes maximum at a zoom position other than the wide-angle end and a telephoto end and (b) such that the C1 and C2 lens groups are located further on the object side at the telephoto end than at the wide-angle end, and
wherein, of the at least two lens groups placed further on the image side than the aperture, at least one of a D1 lens group and a D2 lens group adjacent to each other is moved during the zooming (a) so as to be located further on the object side at the telephoto end than at the wide-angle end and (b) such that a distance between the D1 and D2 lens groups at the telephoto end becomes larger than that at wide-angle end.

2. A zoom lens according to claim 1, wherein the one lens group of the D1 and D2 lens groups is a most-image side lens group of the zoom lens.

3. A zoom lens according to claim 1, wherein, during zooming from the wide-angle end to the telephoto end,
the first lens group is not moved,
the second lens group is moved to the image side,
the third and fourth lens groups are moved so as to draw loci convex toward the object side to be located further on the object side at the telephoto end than at the wide-angle end, and
the fifth lens group is moved so as to be located further on the object side at the telephoto end than at the wide-angle end, and
wherein the aperture is placed further on the object side than the fourth lens group,
the third lens group is the C1 lens group,
the fourth lens group is the C2 and D1 lens groups, and
the fifth lens group is the D2 lens group.

4. A zoom lens according to claim 1 further comprising a sixth lens group placed further on the image side than the fifth lens group and having a positive refractive power,
wherein, during zooming from the wide-angle end to the telephoto end,
the first lens group is not moved,
the second lens group is moved to the image side,
the third and fourth lens groups are moved so as to draw loci convex toward the object side to be located further on the object side at the telephoto end than at the wide-angle end,
the fifth lens group is moved so as to be located further on the object side at the telephoto end than at the wide-angle end, and
the sixth lens group is moved such that a distance thereof from the fifth lens group is changed, and
wherein the aperture is placed further on the object side than the fourth lens group,
the third lens group is the C1 lens group,
the fourth lens group is the C2 lens group,
the fifth lens group is the D1 lens group, and
the sixth lens group is the D2 lens group.

5. A zoom lens according to claim 1, wherein the following conditions are satisfied:

$$1.2 < |MD1/MD2| < 20.0$$

$$0.02 < |MD1/M2| < 0.50$$

where MD1 represents a movement amount of the D1 lens group during zooming from the wide-angle end to the telephoto end, MD2 represents a maximum movement amount of the D2 lens group during the zooming from the wide-angle end to the telephoto end, and M2 represents a movement amount of a most-movable lens group whose movement amount during the zooming from the wide-angle end to the telephoto end is maximum among those of the at least five lens groups.

6. A zoom lens according to claim 1, wherein the following conditions are satisfied:

$$0.05 < |MaxC12/(M2 \times C12w/C12t)| < 0.50$$

$$0.010 < |MC1/M2| < 0.200$$

$$0.010 < |MC2/M2| < 0.200$$

where MaxC12 represents a maximum distance on the optical axis between the C1 and C2 lens groups during zooming from the wide-angle end to the telephoto end, C12w represents a distance on the optical axis between the C1 and C2 lens groups at the wide-angle end, C12t represents a distance on the optical axis between the C1 and C2 lens groups at the telephoto end, MC1 represents a movement amount of the C1 lens group during the zooming from the wide-angle end to the telephoto end, MC2 represents a movement amount of the C2 lens group during the zooming from the wide-angle end to the telephoto end, and M2 represents a movement amount of a most-movable lens group whose movement amount during the zooming from the wide-angle end to the telephoto end is maximum among those of the at least five lens groups.

7. A zoom lens according to claim 1, wherein the following condition is satisfied:

$$0.8 < |\phi C1/\phi C12| < 3.0$$

where $\phi C1$ represents a refractive power of the C1 lens group, and $\phi C12$ represents a combined refractive power of the C1 and C2 lens groups at the wide-angle end.

8. A zoom lens according to claim 1, wherein, of the at least four lens groups to be moved during the zooming, at least one lens group provides a demagnifying effect during zooming from the wide-angle end to the telephoto end.

9. A zoom lens according to claim 1, wherein the following conditions are satisfied:

$$0.00<|\beta Td/(\beta wd\times Z)|<0.20$$

$$0.05<|\beta TC1/(\beta wC1\times Z)|<0.50$$

$$0.05<|\beta TC2/(\beta wC2\times Z)|$$

$$0.00<|\beta TD1/(\beta wD1\times Z)|<0.50$$

$$0.00<|\beta TD2/(\beta wD2\times Z)|<0.50$$

where βwd and βTd respectively represent lateral magnifications of a strongest-demagnifying lens group providing a strongest demagnifying effect at the wide-angle end and the telephoto end, βwC1, βwC2, βwD1, βwD2 respectively represent lateral magnifications of the C1, C2, D1 and D2 lens groups at the wide-angle end, βTC1, βTC2, βTD1, βTD2 respectively represent lateral magnifications of the C1, C2, D1 and D2 lens groups at the telephoto end, and Z represents a zoom ratio of the zoom lens.

10. An image pickup apparatus comprising:
a zoom lens; and
an image sensor to receive an optical image formed by the zoom lens,
wherein the zoom lens comprising at least five lens groups including in order from an object side to an image side:
a first lens group having a positive refractive power;
a second lens group having a negative refractive power;
a third lens group having a negative refractive power;
a fourth lens group having a positive refractive power; and
a fifth lens group having a positive refractive power,
wherein, of the at least five lens groups, at least four lens groups are moved during zooming on an optical axis, the at least four lens group including at least two lens groups placed further on the image side than an aperture to decide an axial maximum light flux diameter at a wide-angle end,
wherein, of the at least four lens groups to be moved during the zooming, a C1 lens group and a C2 lens group adjacent to each other are moved so as to draw mutually different loci during the zooming (a) such that a distance between the C1 and C2 lens groups becomes maximum at a zoom position other than the wide-angle end and a telephoto end and (b) such that the C1 and C2 lens groups are located further on the object side at the telephoto end than at the wide-angle end, and
wherein, of the at least two lens groups placed further on the image side than the aperture, at least one of a D1 lens group and a D2 lens group adjacent to each other is moved during the zooming (a) so as to be located further on the object side at the telephoto end than at the wide-angle end and (b) such that a distance between the D1 and D2 lens groups at the telephoto end becomes larger than that at wide-angle end.

* * * * *